(12) United States Patent
Nadkarni

(10) Patent No.: US 8,554,754 B2
(45) Date of Patent: Oct. 8, 2013

(54) SKILLS DATABASE MANAGEMENT SYSTEM AND METHOD

(75) Inventor: Uday Nadkarni, Monmouth Jct., NJ (US)

(73) Assignee: Harrington Technologies LLC, Wilmington, DE (US)

( * ) Notice: Subject to any disclaimer, the term of this patent is extended or adjusted under 35 U.S.C. 154(b) by 354 days.

(21) Appl. No.: 11/837,961

(22) Filed: Aug. 13, 2007

(65) Prior Publication Data
US 2008/0034002 A1 Feb. 7, 2008

Related U.S. Application Data

(63) Continuation of application No. 09/904,062, filed on Jul. 12, 2001, now abandoned, and a continuation of application No. 09/130,819, filed on Aug. 7, 1998, now Pat. No. 6,266,659.

(60) Provisional application No. 60/055,316, filed on Aug. 7, 1997.

(51) Int. Cl.
*G06F 17/30* (2006.01)

(52) U.S. Cl.
USPC .......................................................... 707/706

(58) Field of Classification Search
USPC .............................................. 707/706, 999.3
See application file for complete search history.

(56) References Cited

U.S. PATENT DOCUMENTS 4,095,799 A    6/1978  Stinger
4,706,212 A    11/1987 Toma
4,744,050 A    5/1988  Hirosawa et al.
4,750,122 A    6/1988  Kaji et al.
4,847,766 A    7/1989  McRae et al.
5,117,353 A    5/1992  Stipanovich et al.
5,157,783 A    10/1992 Anderson et al.
5,164,897 A *  11/1992 Clark et al. ................... 705/321
5,164,899 A *  11/1992 Sobotka et al. ................ 704/9
5,197,004 A *  3/1993  Sobotka et al. .............. 705/7.14
5,283,731 A    2/1994  Lalonde et al.
5,416,694 A *  5/1995  Parrish et al. ................ 705/7.14
5,506,984 A    4/1996  Miller
5,592,375 A    1/1997  Salmon et al.
5,649,205 A *  7/1997  Martins ............................. 1/1
5,657,450 A *  8/1997  Rao et al. ........................... 1/1

(Continued)

OTHER PUBLICATIONS

"Non Final Office Action", U.S. Appl. No. 09/130,819, (Jul. 6, 2000).

(Continued)

*Primary Examiner* — Rovert Beausoliel, Jr.
*Assistant Examiner* — Noosha Arjomandi

(57) ABSTRACT

A computer-based on-line skills/résumé management system, the system comprising: (a) a relational database having a plurality of fields wherein a portion of the fields are arranged in a hierarchical relationship; (b) database population mechanism for populating the database with information, the population mechanism interfacing with a first user and prompting the first user for information for at least a portion of the fields arranged in the hierarchical relationship; (c) query generation mechanism for interfacing with a second user and prompting the second user to select a combination of the fields in the hierarchical relationship to form at least a portion of a query for searching the database; (d) search mechanism operatively connected to database for applying the query to the relational database; and (e) output mechanism for providing the second user with results of the search.

17 Claims, 32 Drawing Sheets

(56) References Cited

U.S. PATENT DOCUMENTS

| | | | |
|---|---|---|---|
| 5,758,324 A * | 5/1998 | Hartman et al. | 705/1.1 |
| 5,832,497 A * | 11/1998 | Taylor | 707/104.1 |
| 5,862,223 A * | 1/1999 | Walker et al. | 705/50 |
| 5,884,272 A | 3/1999 | Walker et al. | |
| 5,987,422 A | 11/1999 | Buzsaki | |
| 6,266,659 B1 * | 7/2001 | Nadkarni | 705/7.14 |
| 6,338,068 B1 * | 1/2002 | Moore et al. | 1/1 |
| 6,564,188 B2 | 5/2003 | Hartman et al. | |
| 6,718,345 B2 | 4/2004 | Hartman et al. | |
| 2002/0111958 A1 | 8/2002 | Hartman et al. | |
| 2002/0116391 A1 | 8/2002 | Nadkarni | |
| 2003/0195767 A1 | 10/2003 | Hartman et al. | |
| 2005/0144101 A1 * | 6/2005 | Khandros et al. | 705/35 |

OTHER PUBLICATIONS

"Notice of Allowance", U.S. Appl. No. 09/130,819, (Jan. 30, 2001).

"Final Office Action", U.S. Appl. No. 09/904,062, (Apr. 13, 2007).

"Non-Final Office Action", U.S. Appl. No. 09/904,062, (Aug. 31, 2006).

"Examiners Answer to Appeal Brief", U.S. Appl. No. 09/904,062, (Feb. 27, 2006).

"Final Office Action", U.S. Appl. No. 09/904,062, (Mar. 1, 2005).

"Non Final Office Action", U.S. Appl. No. 09/904,062, (May 7, 2004).

* cited by examiner

| M | Id | Name | Exp. | Education | Confirmed | Available | UNIX | Oracle 7.x | Vendor |
|---|---|---|---|---|---|---|---|---|---|
| ✓ | 00700725 | Dasari, Jaipai | 3 | Bachelor | 07/01/98 | 04/28/98 | 12 | 25 | JK Technology |
|   | 00700294 | Gopal, MVA |   | Bachelor | 07/01/98 | 03/24/98 | 9 | 12 | Bravakis & Co. |
| ✓ | 00700503 | Lawrence, John | 3 | Bachelor | 07/01/98 | 04/24/98 | 6 | 35 | JK Technology |
| ✓ | 00700196 | Mehta, Jinesh |   | Bachelor | 07/01/98 | 03/23/98 | 171 | 171 | Bravakis & Co. |
| 1 | 00700699 | Murthy, K. | 3 | Bachelor | 07/01/98 | 04/27/98 | 5 | 11 | JK Technology |
|   | 00700450 | Reddy, Sridhar | 3 | Bachelor | 07/01/98 | 04/23/98 | 9 | 32 | Infinix Corporation |
|   | 00700812 | Sankaran, Ramach | 8 | Bachelor | 07/01/98 | 05/08/98 | 17 | 20 | JK Technology |
|   | 00700462 | Sista, Subba Rao | 3 | Bachelor | 07/01/98 | 04/23/98 | 20 | 24 | Infinix Corporation |
| 2 |   |   |   |   | 07/01/98 |   |   |   | Multiple |

Note: Total Experience in Years and Skill experience in Months

[ Profile... ]  [ Resume... ]  [ Interview... ]  [ OK ]  [ Cancel ]  [ Help ]

Ready | Software | 08/04/98 04:57:26pm

MatchBoard Pro 1.2 [Query-Oracle/1]
Query Maintain Reports Download Setup Window Help Query Scheduled Interviews

| Interview | Status | Candidate Id | Name | Vendor | Query | Project/Po |
|---|---|---|---|---|---|---|
| 1001009027 | Selected | 00700196 | Mehta,Jinesh | Bravakis & Co. | (Untitled) | Central NJ |
| 1002009027 | Selected | 00700274 | Solleti,Satish | Infinix Corp. | (Untitled) | Central NJ |
| 1003009027 | Rejected | 00700339 | Arya,Dinesh | Infinix Corp. | (Untitled) | Central NJ |
| 1004009027 | Selected | 00700385 | Yuvaraj,C. | Infinix Corp. | (Untitled) | Central NJ |
| 1005009027 | Rejected | 00049146 | Vidya,Sree | Infinix Corp. | (Untitled) | Central NJ |
| 1006009027 | Selected | 00700272 | Chakraborty,Kallol | Infinix Corp. | (Untitled) | Central NJ |
| 1007009027 | Rejected | 00700245 | Trivedi,Ninad | Infinix Corp. | (Untitled) | Cental NJ |
| 1008009027 | Cancelled | 00700373 | Ranjah,Rajeev | Infinix Corp. | Sybase People | Central NJ |
| 1009009027 | Selected | 00700272 | Chakraborty,Kallol | Infinix Corp. | Sybase People | Central NJ |
| 1010009027 | Decision Pending | 00700245 | Trivedi,Ninad | Bravakis & Co. | (Untitled) | Central NJ |
| 1011009027 | Selected | 00700294 | Gopal,MVA | Infinix Corp. | (Untitled) | Central NJ |
| 1012009027 | Selected | 00700385 | Yuvaraj,C. | Infinix Corp. | (Untitled) | Central NJ |
| 1013009027 | Decision Pending | 00700274 | Soletl,Satish | Infinix Corp. | (Untitled) | Central NJ |
| 1014009027 | Selected | 00700294 | Gopal,MVA | Bravakis & Co. | (Untitled) | Central NJ |

Delete  Results...  Update  Cancel  Print  Help

Resume Table  Close

Software  08/04/98 05:16:32pm

Ready

FIG. 6(a)

| Select Resumes | | | | | | | |
|---|---|---|---|---|---|---|---|
| For: ● Edit ○ Upload ○ Reconfirm ○ Availability ○ Delete | | | | | | | |
| Type: [All ▼]   Confirmed: [00/00/00] To: [00/00/00]   Available: [00/00/00] To: [00/00/00] | | | | | | | |
| Skills: [▼]   Saved: [00/00/00] To: [00/00/00]   Upload: [00/00/00] To: [00/00/00]   ☐ Delete local copy also   [Find] | | | | | | | |

| Resume File | Main Skills | Available | Confirmed | Hits | Id | Candida |
|---|---|---|---|---|---|---|
| Meka, Ram | SQA Tester | 04/24/98 | 4/24/98 | 7 | 100074 | Meka Ra |
| Sageer, S. | VC++, MFC, Win NT | 03/26/98 | 4/23/98 | 45 | 100045 | Sageer |
| Reddy, Michael | VC++, MFC, Win NT | 03/26/98 | 4/23/98 | 46 | 100046 | Reddy M |
| More, Madhu | 0 | 03/27/98 | 4/20/98 | 2 | 100058 | More Ma |
| Reddy, Sridhar | Oracle Financials | 04/23/98 | 4/23/98 | 14 | 100064 | Reddy S |
| Subba Rao | Oracle Financials + Dev 2000 | 04/23/98 | 4/23/98 | 15 | 100065 | Sista Su |
| Bala, S. | SAP BASIS | 04/25/98 | 4/30/98 | 16 | 100077 | Balasub |
| Phani, Raju | SAP ABAP/4 | 04/24/98 | 4/24/98 | 15 | 100078 | Phani R |
| Gupta, Manish | Sybase DBA | 04/24/98 | 4/24/98 | 7 | 100080 | Gupta M |
| Peram, Mahesh | AS/400, SYNON, RPG | 04/24/98 | 4/24/98 | 4 | 100082 | Peram M |
| Mohammed, Mujib | Win NT Admin, Netware, TCP/IP | 04/24/98 | 4/24/98 | 18 | 100084 | Moham |
| Bala, Raja | Unix/Soaris/UX Admin. | 04/24/98 | 4/24/98 | 18 | 100089 | Balasub |
| Sethuraman, Rajes | Solaris Sys Admin. | 04/27/98 | 4/27/98 | 18 | 100093 | Sethura |
| Ramaiah, Shashi | VB 5.0, Access, SQLServer | 04/28/98 | 4/28/98 | 8 | 100104 | Ramaia |
| Mahalingappa, Girisha | VB 5.0, ActiveX, SQL Server, C++ | 04/28/98 | 4/28/98 | 9 | 100105 | Mahalin |
| Deolekar, Jay | VB, VC++ | 04/28/98 | 4/28/98 | 12 | 100106 | Deoleka |

Incomplete resume cannot upload    [Print]  [Print Mailing Labels]    [Ok]  [Cancel]
Right click a row to view Experience Profile

FIG. 6(b)

MatchBoard Member - [Meka,Ram]
File  Edit  Maintain  Report  Options  Help  Window ID [100074]  Modified 4/24/98 Uploaded 4/24/98    Save Locally | Help | Close About Candidate | Projects Summary | Resume | Upload | Notes

Contact Info
- Last Name: Meka
- First Name: Ram
- Middle Name:
- Address: 666 Plainsboro Road
- Suite 1320
- City: Plainsboro    State: NJ
- Zip: 08536    Country: USA
- Tel (Day): 609-936-0101 ext. 102
- Tel (Eve): 732-555-1212
- Tel (Alt): 609-555-1212
- Fax: 609-936-0202
- Email: uday@infinixcorp.com
- Contact Instructions:

General
- Work Authorization: Temporary Work Permit
- Education Level: Bachelors
- Total Experience (Yrs.): 3.00

Privacy Options
- Display Name?: Display Name
- Show Resume Text?: Yes
- Resume Password: 1234

Job Attributes
- Minimum Rate: 00  Hour
- Date Available: 04/24/98
- Work Hours: Full Time
- Relocate?: Yes
- Job Type: Consulting Only
- Willing to Travel?: Yes
- Notice Period: 1 Week Open existing sheet

FIG. 6(c)

MatchBoard Member - [Meka,Ram]

File  Edit  Maintain  Report  Options  Help  Window

ID 100074  Modified 4/24/98 Uploaded 4/24/98     Save Locally    Help    Close

| About Candidate | Projects Summary | Resume | Upload |

Main Skills  SQA Tester

Notes

| 08/01/98 | Called and left a message for him at his home number re new project. |
| 07/25/98 | Received employment papers. |
| 07/24/98 | Discussed project with investment bank in NYC for web software testing. Agreed to rate of $51/hr for the project. Advised start date of 8/15/98 is firm. |
| 06/15/98 | Does not want to relocate to new project. Will accept anything within 50 miles of home. |

Notes entered here are not transmitted to Match Board Server

Ready

MatchBoard Member - [Meka,Ram]
File  Edit  Maintain  Report  Options  Help  Window Interviews Entered On     [00/00/00] To [00/00/00]    Client [          ▼]   Status [ALL ▼]     [Filter]
Interview Date [00/00/00] To [00/00/00]    Candidate [       ▼]

| Client | Name |
|---|---|
| Root Technology | Ranjan Rajeev |
| City Express Inc. | Balasubramanian |
| Root Technology | Chebolu Ramcha |
| Root Technology | Yuvaraj C. |
| Root Technology | Chebolu Ramcha |
| Root Technology | Yuvaraj C. |
| City Express Inc. | Sageer Sajjad |
| Root Technology | Chebolu Ramcha |
| ABC Inc. ✓ | Chebolu Ramcha |
| City Express Inc. | Yuvaraj C. |
| City Express Inc. ✓ | Yuvaraj C. |
| City Express Inc. | Ranjan Rajeev |

Interview    Query    Result

Client                              Candidate
Pravin Daivi                            Ranjan Rajeev
Root Technology                         100053
praving@infinixcorp
Tel. 609-936-0101
Tel. 609-936-0202

Schedule
Entered  6/29/98
       On  6/30/98   12:30
Location Plainsboro NJ
   Type Telephone
Reconfirm?  Y

Notes
*This is a Test*

[Save]   [Print]   [Close]

Ready

FIG. 6(g)

MatchBoard Member - [Meka,Ram]   _ □ ×
File  Edit  Maintain  Report  Options  Help  Window Interviews   ×

Entered On:    [00/00/00] To: [00/00/00]    Client:    [        ▼]    Status: [ALL] ▼      [ Filter ]
Interview Date: [00/00/00] To: [00/00/00]   Candidate: [        ▼]

| Client | Name |
|---|---|
| Root Technology | Ranjan Rajeev |
| City Express Inc. | Balasubramanian |
| Root Technology | Chebolu Ramcha |
| Root Technology | Yuvaraj C. |
| Root Technology | Chebolu Ramcha |
| Root Technology | Yuvaraj C. |
| City Express Inc. | Sageer Sajjad |
| Root Technology | Chebolu Ramcha |
| ABC Inc. | ✓ Chebolu Ramcha |
| City Express Inc. | Yuvaraj C. |
| City Express Inc. | ✓ Yuvaraj C. |
| City Express Inc. | Ranjan Rajeev |

Interview    Query    Result

Project
    Start       5/7/98          Duration (mos.)  6
    Location    08536           Max. Rate ($/hr) Not Specific
    Job Type    Consulting      Work Hours       Full Time
    Travel      No              Positions        1

Skill Requirements
    Oracle, 3 Years

Education   High School
Keywords

[ Save ]   [ Print ]   [ Close ]

Ready

MatchBoard Member - [Skills Available]

File  Edit  Maintain  Report  Options  Help  Window

For Skills  [ALL]  ▼  Filter  Print  Close

MatchBoard
Candidates

| Resume File | Main Skills | Available | Confirmed | Hits | Id | Candidate |
|---|---|---|---|---|---|---|
| Meka, Ram | SQA Tester | 04/24/98 | 4/24/98 | 7 | 100074 | Meka Ram |
| Sageer, S. | VC++, MFC, Win NT | 03/26/98 | 4/23/98 | 45 | 100045 | Sajeer Sajjad |
| Reddy, Michael | VC++, MFC, Win NT | 03/26/98 | 4/23/98 | 46 | 100046 | Reddy Michael |
| More Madhu | 0 | 03/27/98 | 4/20/98 | 2 | 100058 | More Madhu |
| Reddy, Sridhar | Oracle Financials | 04/23/98 | 4/23/98 | 14 | 100064 | Reddy Sridhar |
| Subba Rao | Oracle Financials + Dev 2000 | 04/23/98 | 4/23/98 | 15 | 100065 | Sista Subba Rao |
| Bala, S. | SAP BASIS | 04/25/98 | 4/30/98 | 16 | 100077 | Balasubramaniam M. |
| Phani, Raju | SAP ABAP/4 | 04/24/98 | 4/24/98 | 15 | 100078 | Phani Raju |
| Gupta, Manish | Sybase DBA | 04/24/98 | 4/24/98 | 7 | 100080 | Gupta Manish |
| Peram, Mahesh | AS/400, SYNON, RPG | 04/24/98 | 4/24/98 | 4 | 100082 | Peram Mahesh |
| Mohammed, Mujib | Win NT Admin. Netware, TCP/IP | 04/24/98 | 4/24/98 | 18 | 100084 | Mohammad Mujeeb |
| Bala, Raja | Unix/Solaris/UX Admin. | 04/24/98 | 4/24/98 | 18 | 100089 | Balasubramaniam Raj |
| Sethuraman, Rajes | Solaris Sys Admin. | 04/27/98 | 4/27/98 | 18 | 100093 | Sethuraman Rajes |
| Ramajah, Shashi | VB 5.0, Access, SQLServer | 04/28/98 | 4/28/98 | 8 | 100104 | Ramajah Shashi |
| Mahalingappa, Girisha | VB 5.0, ActiveX, SQL Server, C++ | 04/28/98 | 4/28/98 | 9 | 100105 | Mahalingappa Girisha |
| Deolekar, Jay | VB, VC++ | 04/28/98 | 4/28/98 | 12 | 100106 | Deolekar Jay |
| Hussain, Farah | VC++,MFC | 04/27/98 | 4/28/98 | 17 | 100108 | Hussain Farah |

Ready

FIG. 6(I)

MatchBoard Member - [Hot Skills]
File  Edit  Maintain  Report  Options  Help  Window From: 00/00/00  Customers:
To: 08/04/98  Skills:  [Filter]

MatchBoard
8/4/98 4:28 PM
Page 9 of 10

Open Inquiries

Entered On 5/1/98
City Express Inc.

Visual C, 1 Year; AND Sybase, 6 Months

Starts On-5/11/98; At - 10001; For- 6 months;
Rate- Unspecified; Work Hours- Full Time;
Position- Temporary; Travel- No;

Entered On 4/30/98
Infinix Corp. - Raj

MVS, 6 Months; AND UNIX, 6 Months; AND C, 6 Months

Starts On-4/29/98; At - 10001; For- 6 months;
Rate- Unspecified; Work Hours- Full Time;
Position- Temporary; Travel- No;

[Print] [Close]

Get opening hires

SKILLS DATABASE MANAGEMENT SYSTEM AND METHOD

REFERENCE TO A RELATED APPLICATION

The present application is a continuation of U.S. application Ser. No. 09/904,062, filed on Jul. 12, 2001 now abandoned which claims the priority of and is a continuation of U.S. application Ser. No. 09/130,819, filed on Aug. 7, 1998 now U.S. Pat. No. 6,266,659 which was based on provisional application 60/055,316 filed Aug. 7, 1997, entitled "Skills Database Management System and Method," all of which are incorporated herein by reference.

FIELD OF INVENTION

The present invention generally relates to a skills/résumé management system. More specifically, the invention relates to a computer-based, skills/résumé management system that provides employers and those seeking employment with on-line access to a skills/résumé relational database.

BACKGROUND OF THE INVENTION

In traditional employment seeking situations, a candidate or a firm offering the services of various candidates (herein a "vendor") submits a résumé to a company for consideration as an employee or an independent contractor. Such a submission is normally in response to a position opening at an employer that the candidate or vendor has learned about via advertisements or through other marketing efforts. The employer then evaluates all the résumés submitted, compares their skills and experience, and selects some of them for interviews or further evaluation. If the employer is interested, it may schedule an interview with the candidate or ask the vendor to arrange one, pursuant to hiring the candidate. Although hiring decisions have been traditionally made in this fashion, the process is far from ideal.

On the candidate side, an effort must be made to identify possible employers and send them a résumé at the time a suitable position is open. Given the vast number of potential employers that may exist for a certain profession, this effort requires assessing which employers are currently hiring and, more specifically, which employers are most likely to hire. Often, this amounts to a hit or miss approach involving subjective decision making and even outright guessing. The candidate consequently may spend time and money repeatedly soliciting an employer who is not interested, or worse, may miss an opportunity with an interested employer.

On the employer side, a vast number of résumés may be received without necessarily being solicited. These résumés require administrative and managerial time and effort to sort through and evaluate them. This can become a time consuming and tedious task. Although software has been developed to scan through these documents, the search techniques used typically involve a simple textual word search. These techniques can be intolerant of terminology, spelling, format, and case differences between the employer's search terms and the résumé terms. Moreover, these search techniques usually are not capable of performing relationship logic or quantitative evaluation of the applicants' skills and experience. Consequently, qualified candidates may be overlooked, and unqualified candidates selected.

The problems faced by candidates and employers are also faced by vendors which match particular candidates to openings of employers. From a vendor's perspective, skilled manpower must be dedicated to matching various employers' job requirements with the backgrounds of available candidates and then submitting those candidates' résumés to the respective employers. Both employers' openings and the available candidates can and do change continuously and rapidly. This results in a high probability of missing business opportunities where a possible match is missed.

Therefore, a need exists for a system which enables vendors and candidates to present their résumés to all interested employers at the time that the employer has appropriate openings. The system should also allow employers to quickly and accurately search for qualified candidates on the basis of quantitative criteria on their skills and experience, without being overly inclusive or exclusive. The present invention fulfills these needs among others.

SUMMARY OF THE PRESENT INVENTION

The present invention provides employers, vendors and employment candidates with "on-line" access to a skills/résumé management system. Structured as a relational database, it enables a user to input and/or search for data with precision in a central hub for use by those seeking employment and those seeking to hire.

The terms "candidate"/"vendor" and "employer" are used herein to designate, respectively, a user inputting or modifying database information and a user searching the database. These terms are used for illustrative purposes and should not be used to limit the scope of the invention. In other words, it is possible that the user inputting information be someone other than a real candidate; likewise, the user performing a search may be someone other than a real employer.

The system comprises a relational database of fields pertaining to employment criteria such as, for example, experience, skills, education, availability, and salary information. A candidate accessing the system responds to prompts to create a experience or skill profile and a résumé, or to update a profile/résumé already on file. Prospective employers accessing the system respond to prompts to create a query that is used to define and perform a search of the database. The system also has output means for providing the employer with a display of candidates meeting the search criteria, and for quantitative comparison of the candidates' experience and skills. In addition, the system may provide the means for a candidate to update his information, e.g., his availability status, and/or retrieve information from the database via a telephone or other communicative link.

An important aspect of the present invention is the standardization, segmentation, and organization of the candidate's skill profile and résumé. Standardization is achieved through the use of system prompts directed to both the candidates when populating the database and the employers when formulating a search query. This ensures that both the candidate and the employer will use the same terminology, thus preventing the spelling, spacing, case, and most importantly, the language of the database from being an issue in the search. Therefore, accuracy and efficiency in selecting data to satisfy a query is facilitated.

The segmentation of the data, that is, the capturing of a candidate's skills or experiences in separate, specific fields (e.g. "Profession", "Category", "Skill", "Specialty"), allows for very precise categorization of skills and experience. As such, the query can be focused and precise and does not rely on the awkward, inefficient, and often error-prone searching of fragments or character strings within long fields. Additionally, in a preferred embodiment, a length-of-time field exists for each skill/category and allows for the summation of time-per-skill across various stretches of employment. In other words, the system can quantify length of experience for a particular skill over discontinuous periods of time. This feature is extremely beneficial since overall experience, not continuous experience, is of primary concern to most employers.

The organization of the data in a relational database allows for sophisticated searching, sorting, and manipulation of the data. With such an organization, it is possible to create queries that can be easily broadened, narrowed, or fine-tuned as warranted after each search to achieve a suitable pool of candidates. If a query results in only one candidate, the employer can broaden the scope of the query to increase its prospects. The several layers of fields that remain linked in the relational database make it possible for an employer to create sophisticated queries based on many combinations of fields and thereby increase the chances of finding the most attractive candidates. This type of flexibility assists an employer in pinpointing very specific combinations of skills in candidates if it so chooses. It also eliminates the chance of a qualified candidate being overlooked had such skills not been captured so precisely. Customized sorting and manipulation of data is also made possible through this type of database. Data can be displayed in the most optimal manner for each search as determined by the employer.

The advantages of the system's standardization, segmentation and organization of information, as described above, are facilitated, in large part, by a hierarchical and/or networked relational database. More specifically, the system organizes at least a portion of information in a hierarchical relationship of fields or in fields that are otherwise networked together. In a preferred embodiment, information regarding a candidate's experience or skill profile is structured in layers. For example, the broadest or upper layer may be the candidate's profession. Depending from this layer are a number of categories relating to that profession. Each category may in turn have subcategories within it, all of which relate to the layer above it. This segmentation may be several layers deep. Individual segments (e.g. a subcategory) may also have multi-threaded hierarchical relationships among its members. Furthermore, the relationships between the various layers of segmentation may be 1 to M, meaning that a subcategory relates to just one category, or M to N, meaning that a subcategory relates to one or more categories.

Yet another advantage of this invention is the ease of access for both the candidate and the employer. It is feasible to go on-line wherever there is a telecommunications link—at home, at the office, and even during travel. As used herein, the term "on-line" broadly refers to a system offering telecommunicative interfaces with its users, and may exist as a stand-alone dial-up service or a point on the internet or other type of network. This is an advantage not only because of comfort and convenience, but also because of efficiency. The user accesses the system directly so there is no need for faxes, third parties, answer machines, etc, to retrieve the most recent information. The present invention provides employers, vendors and employment candidates with "on-line" access to a central skills/résumé management system. Structured as a relational database, it enables a user to input and/or search for data with precision in a central hub for use by those seeking employment and those seeking to hire.

BRIEF DESCRIPTION OF THE DRAWINGS

The invention may best be understood by reference to the following description taken in conjunction with the accompanying drawings, wherein like reference numerals identify like elements, and wherein:

Figure 5C:
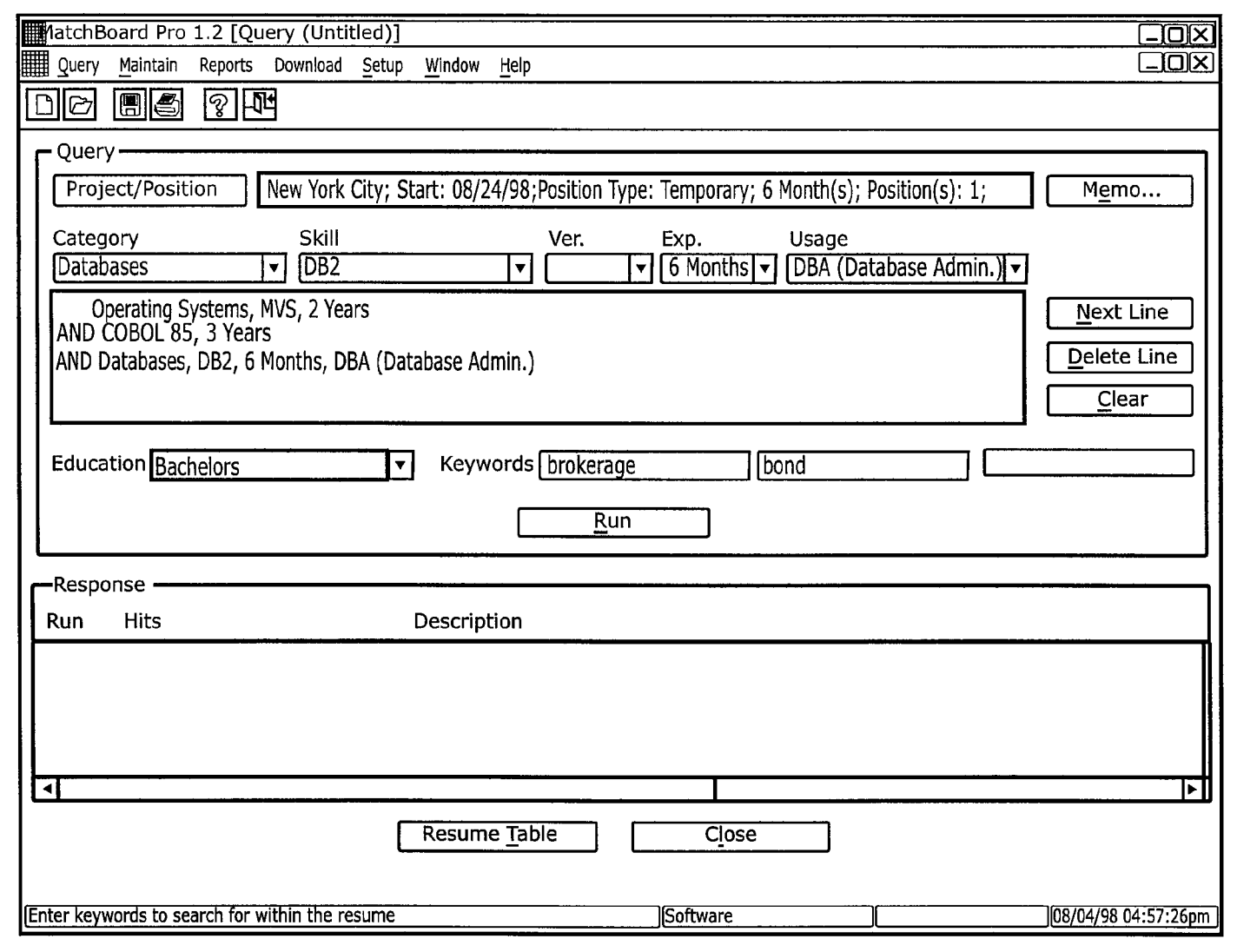
Figure 5D:
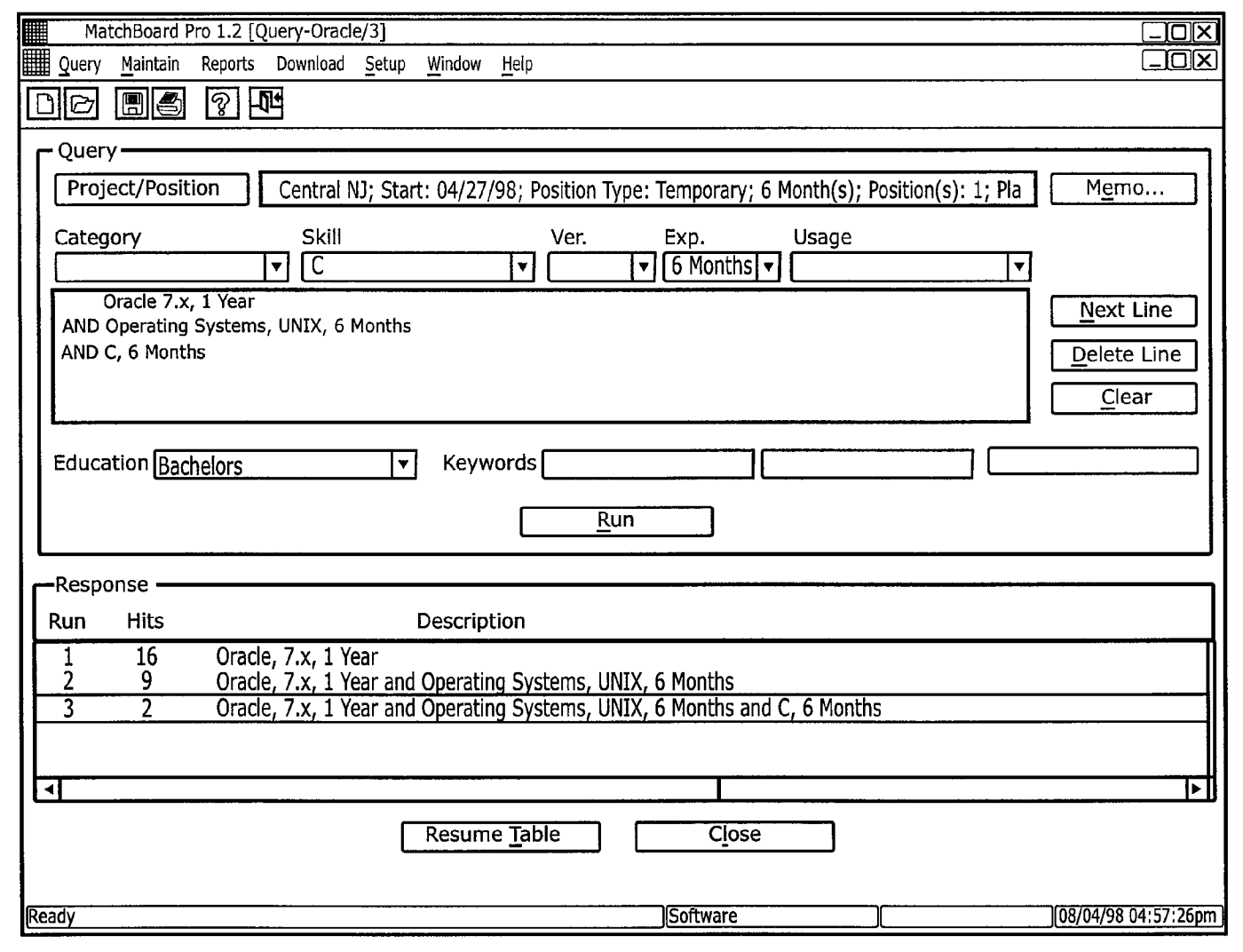

FIGS. 5a-m show screen print-outs during query-formation steps.

DETAILED DESCRIPTION OF THE PRESENT INVENTION

The present invention is directed to a computer-based, on-line skills and résumé management system. In a preferred embodiment, the system comprises at least one relational database having a plurality of fields, and at least a portion of the fields are hierarchical or otherwise networked. The database is populated with information by population means which interface with a candidate or vendor and prompts him or her for information relating to a portion of the fields in the hierarchy. The system also has query generation means for interfacing with an employer and prompting the employer to select a combination of the fields in the hierarchy to form a query. To apply the query to the relational database, the system uses search means operatively connected to the database. The system has output means for providing the employer with results of the search. The system may also have tabular and graphical means of making quantitative comparisons of the selected candidates based on criteria selected by the employer.

The present invention may be practiced using a system of conventional components configured according to conventional technology. For example, a personal or other computer equipped with a graphical interface terminal and a telecommunication link (modem, network connection, internet access, etc.), may be utilized to access the system. A suitable system 100 is depicted schematically in FIG. 1. For discussion purposes, the system is divided into an administration domain 111 and a user domain 112.

Figure 1:
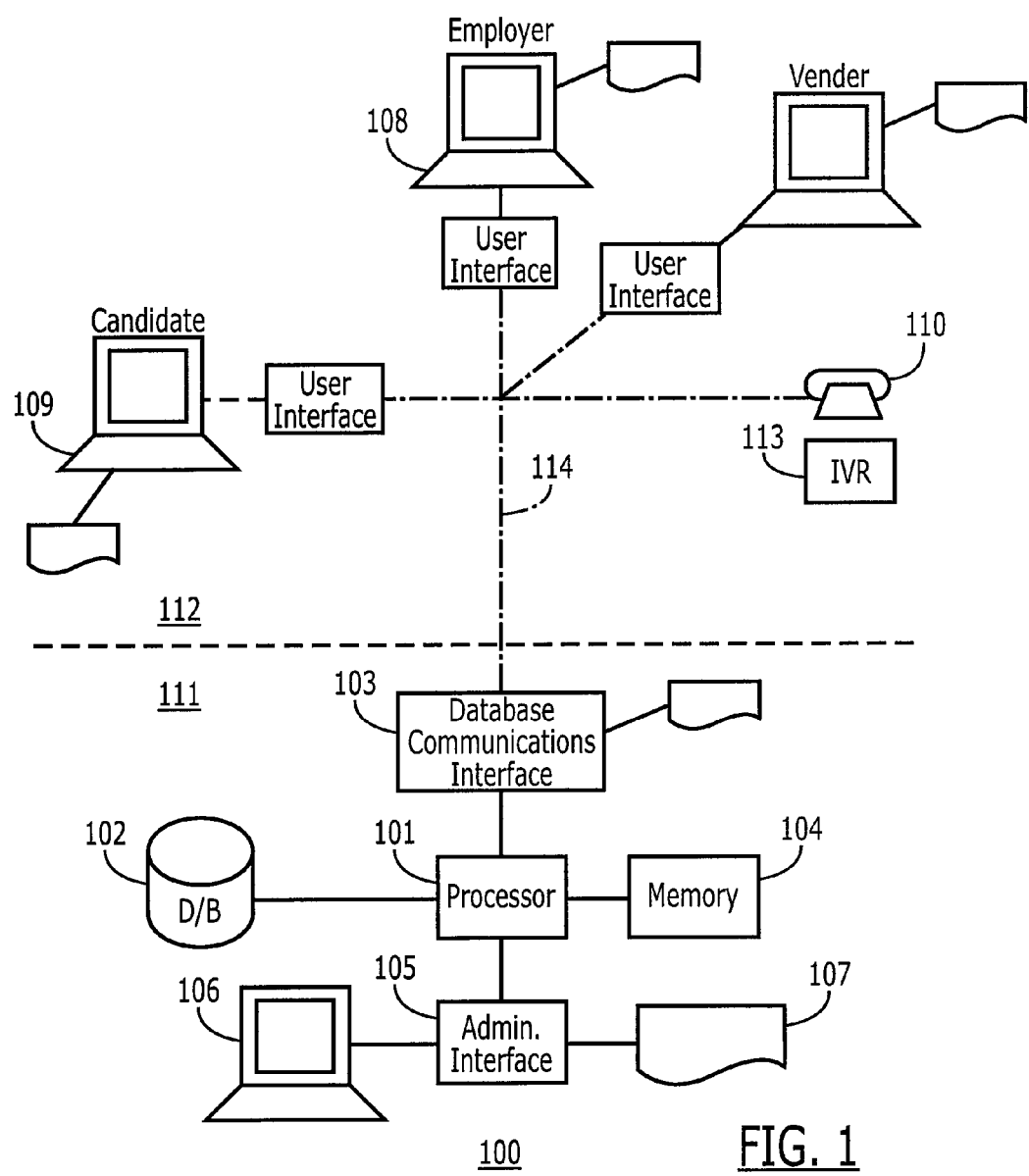
FIG. 1 shows a schematic diagram of an on-line skills and resume database management system.

The skills/résumé database system is contained in the administration domain 111. Central to the system is a central processing unit (CPU) 101. The CPU 101 may be a single processor, or a combination of processors, which may be configured in a PC, work station, main frame or the like. Such CPUs are known in the art. Operatively connected to the CPU is a database 102. Database 102 can be any computer readable medium such as a hard drive, floppy disk, tape, CD ROM, RAM or other suitable medium. Additionally, it should be understood that, although only one database is depicted in FIG. 1, a plurality of discrete databases configured to cooperate with one another may be employed. Also operatively connected to the CPU 101 is memory 104 which contains a program of instructional means for the system 100 to perform the process of the present invention. Memory 104 can be any known memory medium such as RAM or PROM. The CPU 101 has a database and communications interface 103 that, in a preferred embodiment, uses a telecommunicative link 114 to operatively connect to user interfaces in the user domain 112. The telecommunicative link can be any device that enables a computer to communicate over land based and/or wireless paths. To provide access to the system for maintenance, control and monitoring, an administration interface 105 may be operatively connected to the CPU. In one embodiment, the administration interface 105 is connected to an operator's interface 106, which may include a display and input means, and provides reports 107.

In the user domain 112, the system provides various means of communication. An employer 109 may access the system using a computer 108 over a telecommunicative link 114. In this way, the employer may search for prospective candidates from the convenience of the home or office. Likewise, a candidate 108 using a computer 109 may access the system via telecommunication link 114 to populate the database with information from his résumé. The candidate may also access the system 100, without the use of a computer, through a conventional telephone 110 using an Interactive Voice Response (IVR) system for updating his or her availability status and for obtaining information from the system.

As mentioned above, the memory 104 contains a program of instructional means for the system 100 to provide candidates, vendors, and/or employers with "on-line" access to populate and search a résumé relational database. The program may be adapted to function on known operating platforms and is anticipated to be compatible with emerging operating platforms as well. The program may be stored on any computer readable medium such as a disk, tape, CD ROM, RAM or PROM.

Figure 2:
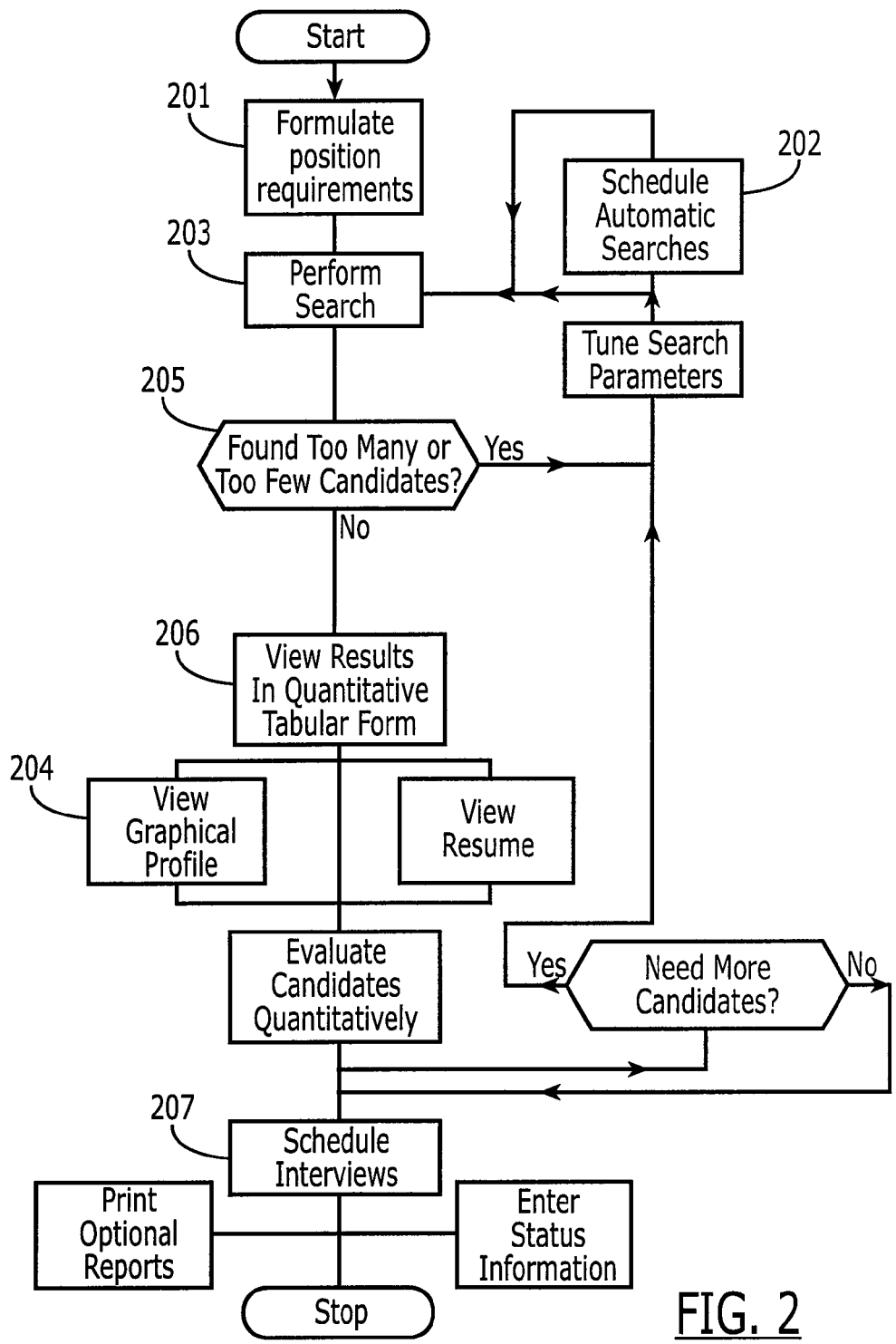
FIG. 2 shows a flow diagram for performing a resume search on the system shown in FIG. 1.

In one embodiment, the system enables the computer apparatus 100 to perform searching and populating aspects of the process as depicted in FIGS. 2 and 3, respectively. These figures are described in greater detail below. Throughout this description, reference is made to Appendices A and B, which contain a selection of screen printouts from the operators interface. Appendix A contains printouts of screens A-1 though A-13 corresponding to the screens typically used by employers and Appendix B contains print-outs of screens B-1 through B-14 corresponding to screens typically used by candidates/vendors. It will be readily apparent to one skilled in the art that the screens shown in Appendices A & B are only illustrative of the type of displays possible within the scope of the present invention and that the screens can be modified according to a particular application. All screens disclosed herein are Copyrighted, 1998, by Infinix Corp., all rights reserved.

FIG. 2 shows a general process flow diagram of the search process of the present invention. As shown in Block 201, the employer formulates a query based on the requirements of the position opening (see Appendix A-1-A-3). The formulation of the query search engine (domain 111, FIG. 1) is done by responding to prompts and/or pull-down menus from the system that correspond to the standardization, segmentation and organization of the relevant skills. This step is considered in greater detail with respect to FIG. 4.

A search is performed in Block 203 by a search engine (domain 111, FIG. 1) once the inquiry has been formulated. Block 205 determines whether or not the employer is satisfied with the results, i.e. whether he has found too many or too few qualified candidates (see Appendix A-4). If not, the process returns to Block 203 where the search query is refined. This refinement can be made by tightening or relaxing the qualifications listed, or by adding or deleting qualifications. The search can also be restricted to just preferred or otherwise selected groups of candidates/vendors. The system may even be restricted to retrieving candidates/vendors whom the employer has not yet seen. Furthermore, the employer may request the system to perform automatic searches periodically (i.e., once a day) and alert the employer when new, qualified candidates are found.

If the employer is satisfied with the inquiry, the process proceeds to Block 206 where the results can be, compared, sorted and manipulated according to the employer's preferences (Appendix A-5). The employer also may view a candidate's experience profile graphically (see Appendix A-6), or his/her entire résumé (see Appendix A-7). If the employer is particularly interested in a candidate, the employer may schedule an interview on-line with the candidate in Block 207 (see Appendix A-8). The system also may keep track of interviews (see Appendix A-9) and vendors (see Appendices A-10 & A-11). It is anticipated that the results of an interview or work history of a particular candidate may be added to the database and thereby become searchable. for intra-office or inter-office recruiting. Thus, the system of the present invention allows an employer to access a centralized database via a telecommunication link, formulate searches, review the results of said searches, and even schedule interviews with preferred candidates.

Figure 3A:
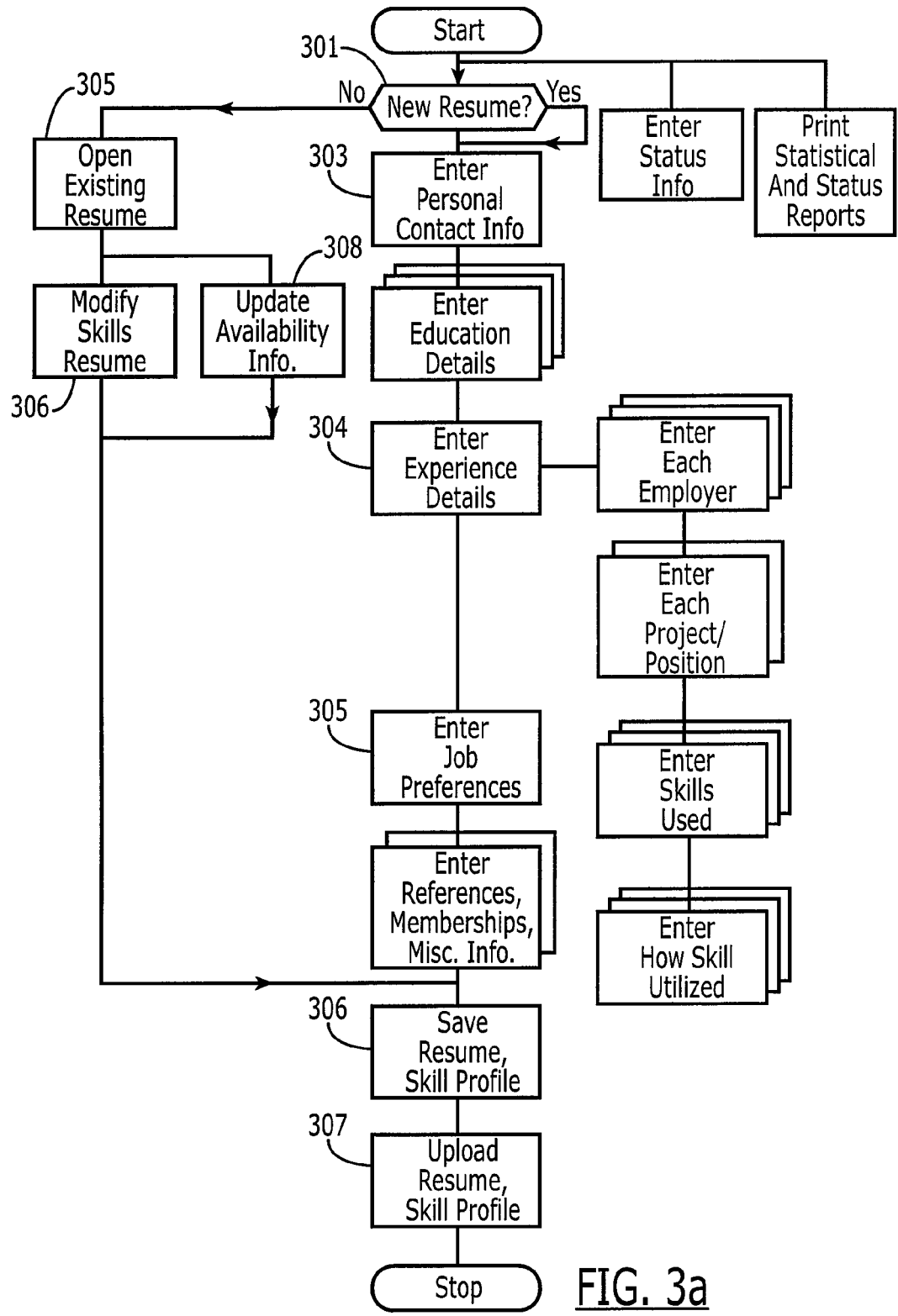
FIGS. 3A & 3B show flow diagrams for populating the database and indicating candidate status respectively.
Figure 3B:
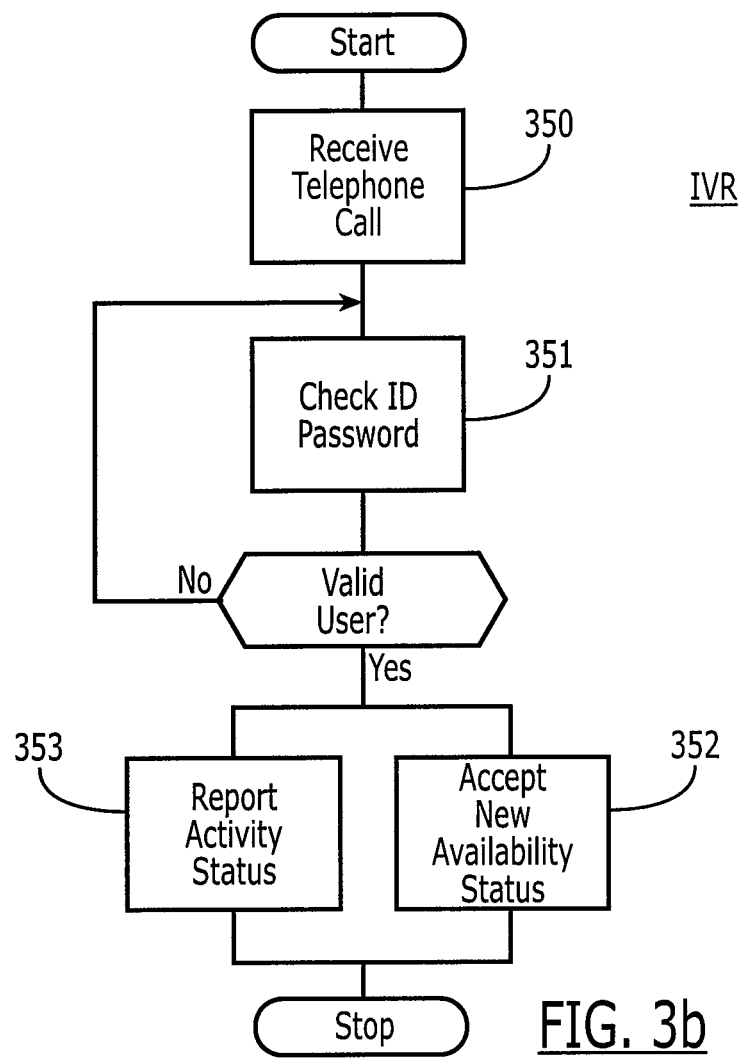

FIG. 3*a* and 3*b* show process embodiments of the present invention wherein the candidate or vendor accesses the system via a telecommunicative link to enter or update one or more skill profiles or résumés. By way of example, the process described herein and the corresponding screens relate specifically to a vendor's use, although it should be understood that the process for an individual candidate is the same, except that, rather than managing multiple candidates, a sole candidate need only manage his own data entry.

In FIG. 3*a*, a flow diagram is shown of a vendor populating/monitoring the database with skill and résumé information for one or more candidates. In Block 301, the vendor is questioned whether he or she is modifying an existing résumé or entering one for the first time. If the former, the process proceeds to Block 305 and 306 where the vendor selects a candidate, and modifies the information previously entered into the database (see Appendices B-1 through B-5). If the vendor is populating the database for the first time for a particular candidate, however, the process instead proceeds to Block 303 where the vendor enters details about the candidates background in templates provided by the system (similar to Appendices B-1 through B-5 except blank).

In Block 304, the vendor enters the experience profile in response to system lists within a template (see Appendix B-3). Additionally, the vendor can enter skills or experience not presented by the system. This information can be entered into fields at a later time after being analyzed for proper standardization, segmentation, and organization. The data fields available to the vendor for population are similar in standardization, segmentation and organization to that of fields provided to the employer to formulate the search. The candidate populates a field with information if appropriate while the employer selects whether the field is important and should be searched.

In Block 305, the vendor enters details regarding the work one of its candidates is seeking (see Appendix B-2). In Block 307, the candidate enters other information normally present in a résumé that would be of interest to a prospective employer (see Appendix B-4). The vendor/candidate may preview or print the résumé as it is being compiled by the system.

Once the vendor/candidate is satisfied, the process proceeds to Block 306 where he or she can save the résumé. The candidate may be asked to review and agree to the terms and conditions of using the on-line résumé database management system. Optionally, the vendor/candidate or employer may be required to pay charges for use of the system. In Block 307, after the vendor/candidate has entered the information and agreed to the terms and conditions of using the system, the information is up-loaded to the system, reviewed, and becomes part of the relational database and thus accessible to potential employers. The candidate may also update certain availability information to the database (e.g. date available for a new position, or date last indicated that candidate was still seeking employment).

It may be preferable in certain situations to limit dissemination of a particular candidates résumé, or to search the résumés of those candidates responding to a particular opening. For example, a candidate may not want his résumé available to all that search the database, but rather, to just certain employers, perhaps in response to a particular advertisement. Likewise, an employer may want to tailor its search to include those candidates indicating an interest in a particular opening. In such cases, the candidate may include with its job preference an indicia either to identify the opening to which the candidate is responding, or otherwise to identify those employers to which the candidate consents to having his résumé released. The indicia can be used to tag the candidate's résumé for an employer's search and/or to file the résumé immediately in the employer's mailbox, a mailbox corresponding to the position opening, or the like.

If a vendor is using the system, bulk performance of certain activities is possible (e.g. uploading résumés, entering date indicated that candidate(s) were still available, etc.) (see Appendix B-10). Vendors can also print reports on interviews scheduled by employers for their candidates (see Appendices B-6 through B-8), employer activity (see Appendix B-9), open inquires (see Appendix B-12), skill demands (see Appendix B-14), client contacts (see Appendix B-13), candidate experience profiles (see Appendix B-11) and other evaluation statistical reports. Furthermore, in one embodiment, the system is capable of identifying those positions which remain open and are in need of a match, and providing a list of these positions to those vendors selected by the employer resulting in an accurate up to date list of openings upon which vendors can focus their recruiting efforts.

In FIG. 3b, an optional feature of the present invention is depicted in a flow diagram. This particular process allows a candidate to telephone the central résumé database management system 100 and update his or her availability status. As shown in Block 350, after the system receives a phone call from the candidate, Block 351 prompts the candidate to enter an ID and/or password to confirm his or her authenticity. In Block 352, the candidate indicates his or her availability status. The system may also report certain status and activity information about the candidate to the candidate (Block 353).

In an alternate embodiment, the candidate's résumé is entered into the system by administrative personnel using the administrative interface. Such an alternative may be beneficial in those situations where on-line access is unavailable to a particular candidate. Likewise, formulating the search queries also may be performed by system administrative at the request of employers.

Figure 4:
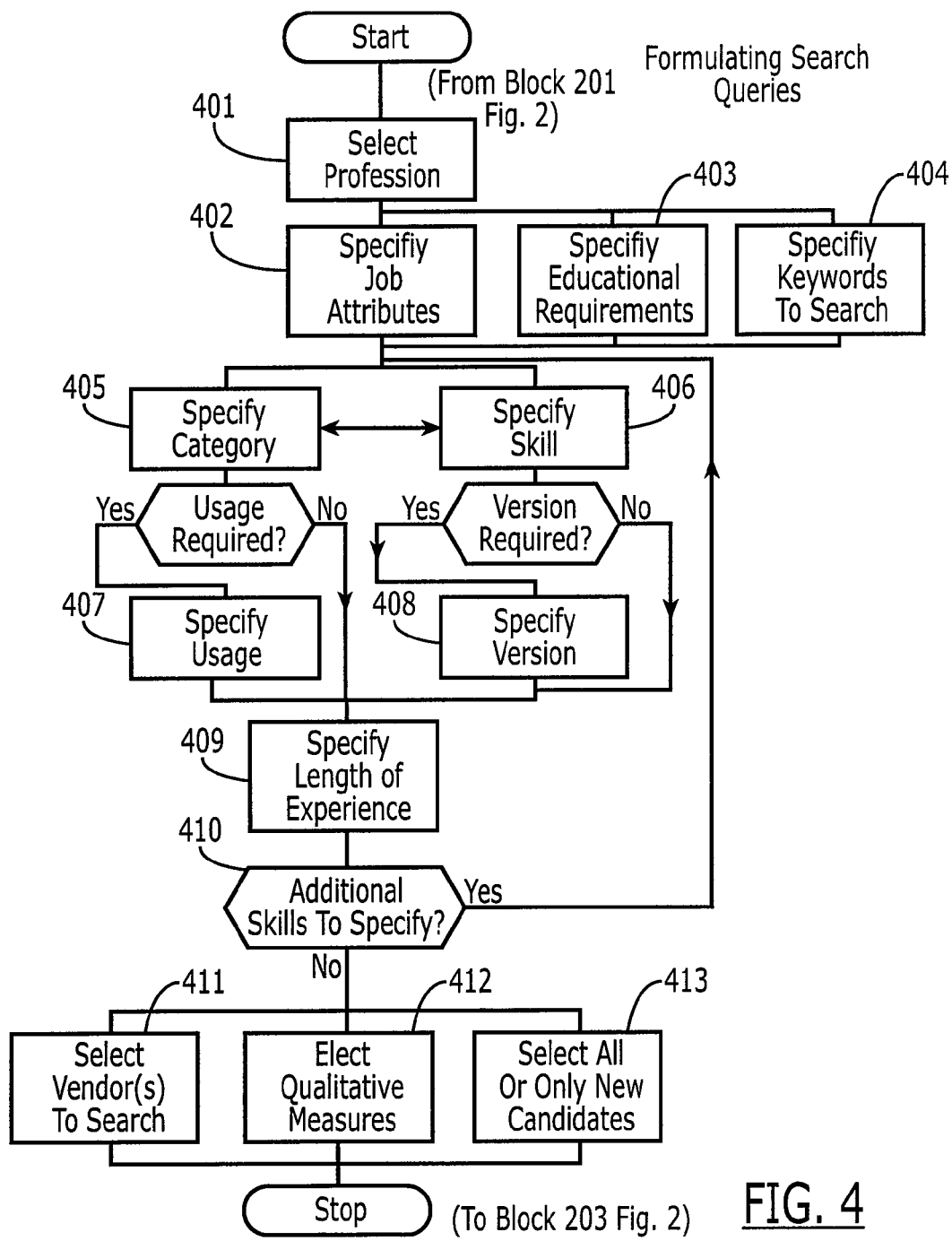
FIG. 4 shows a flow diagram of the process of developing a search query.
Figure 5A:
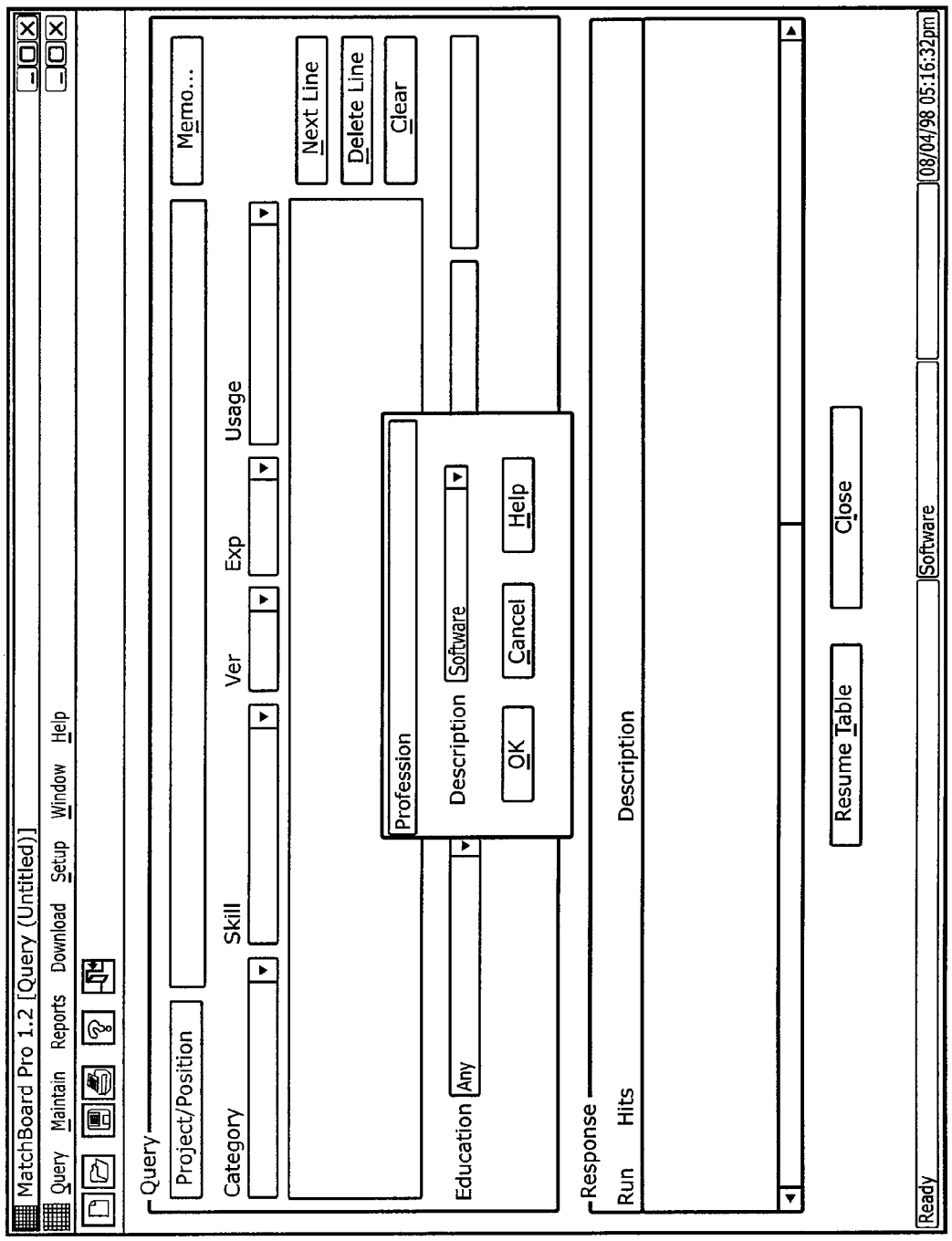
Figure 5B:
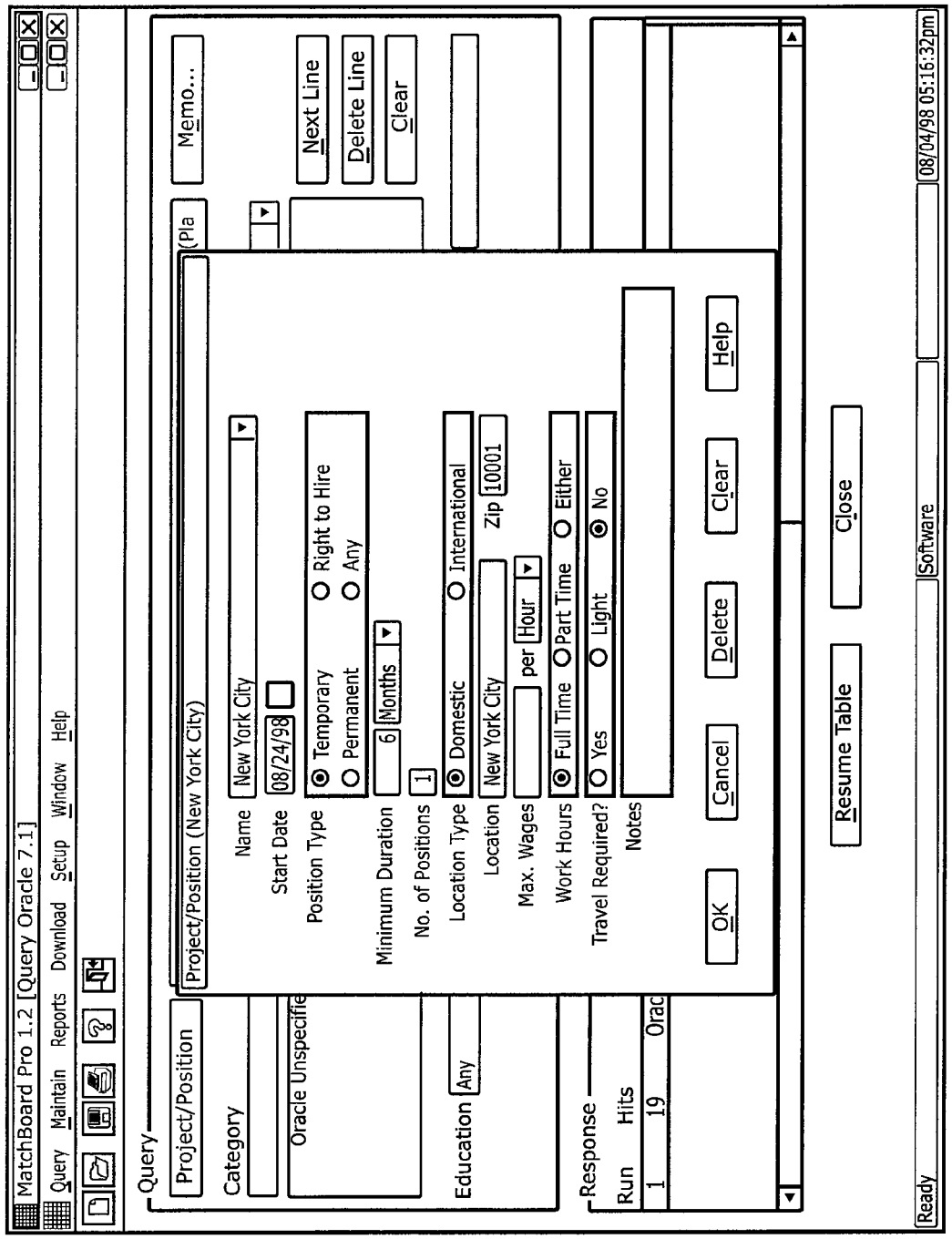
Figure 5F:
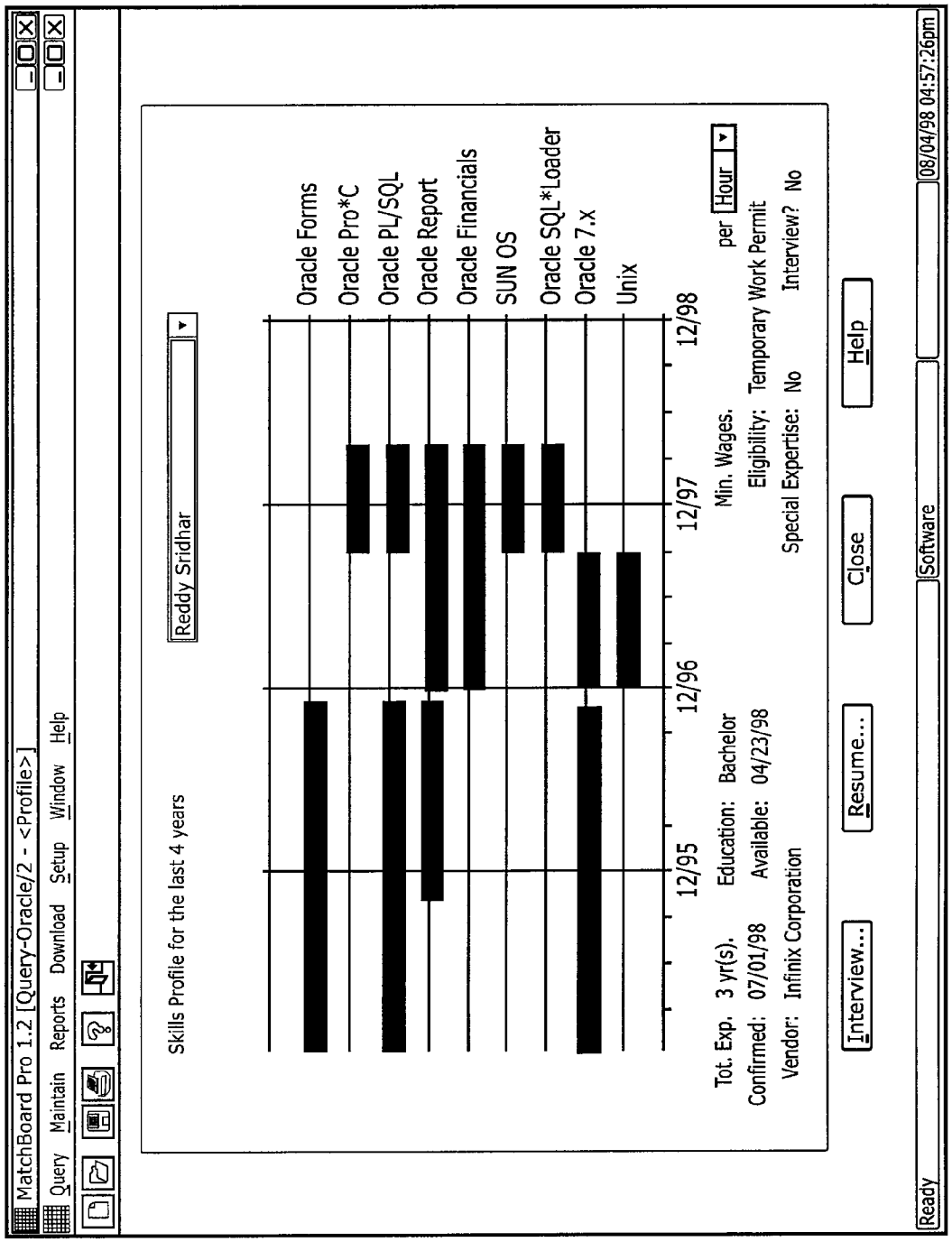
Figure 5G:
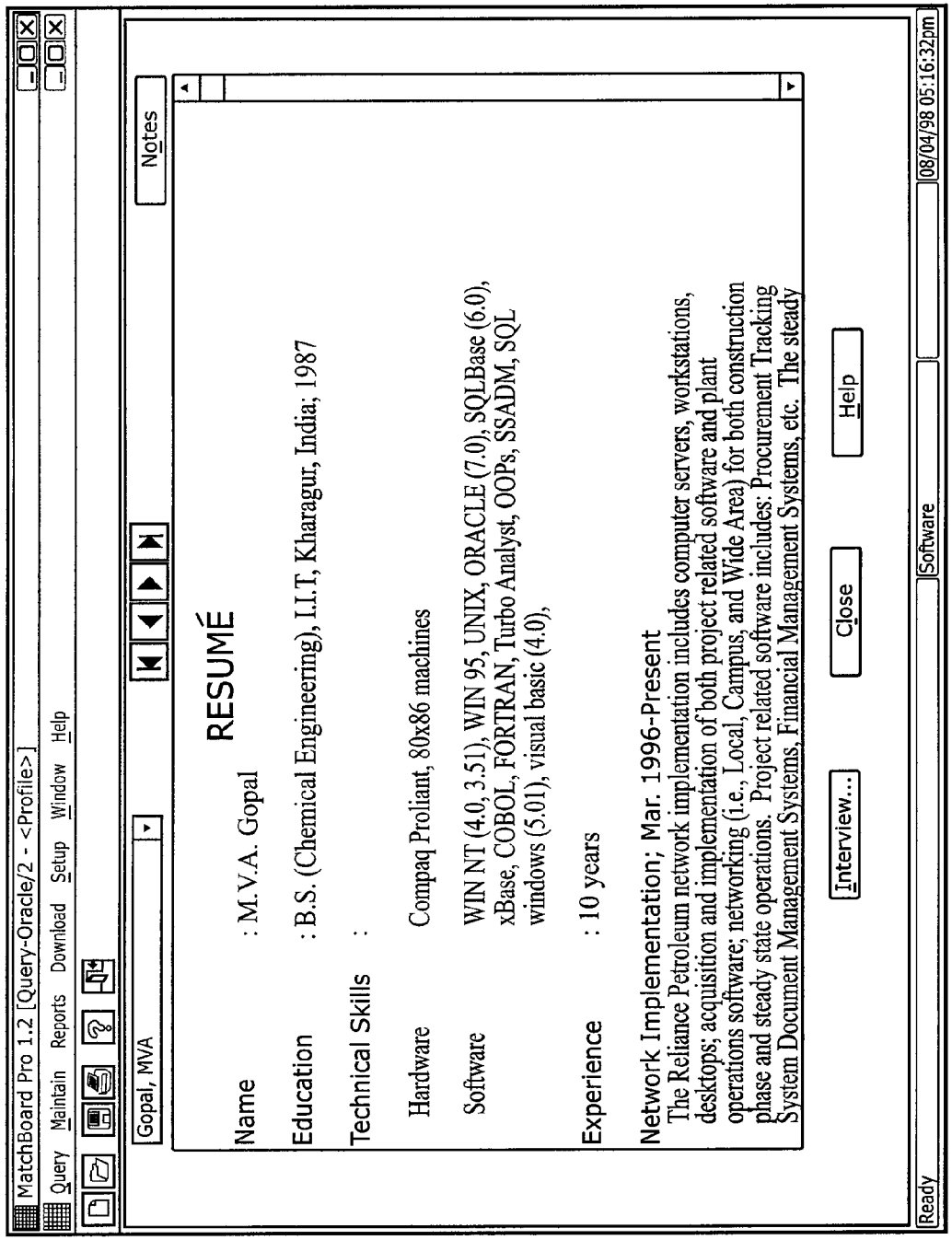
Figure 5H:
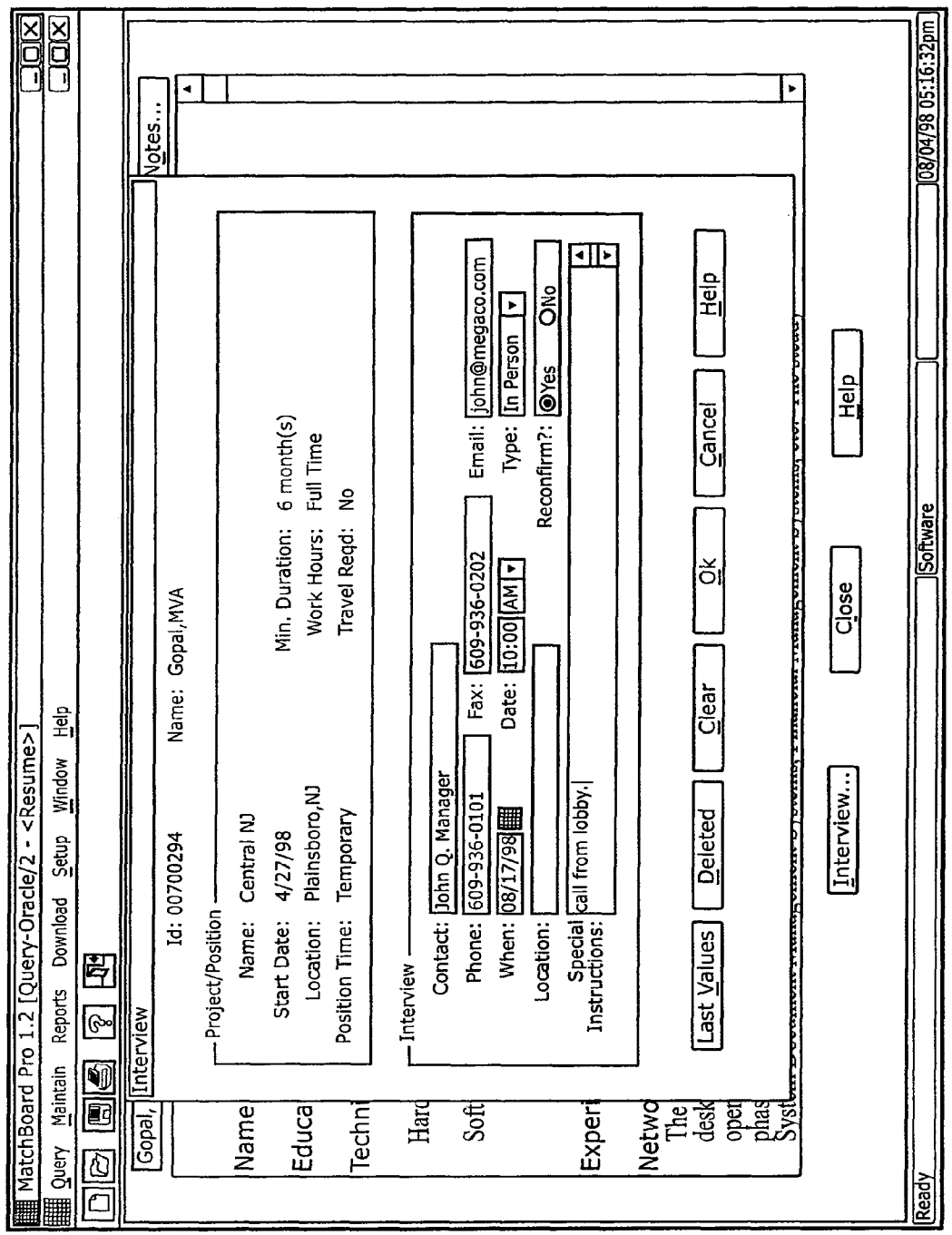
Figure 5J:
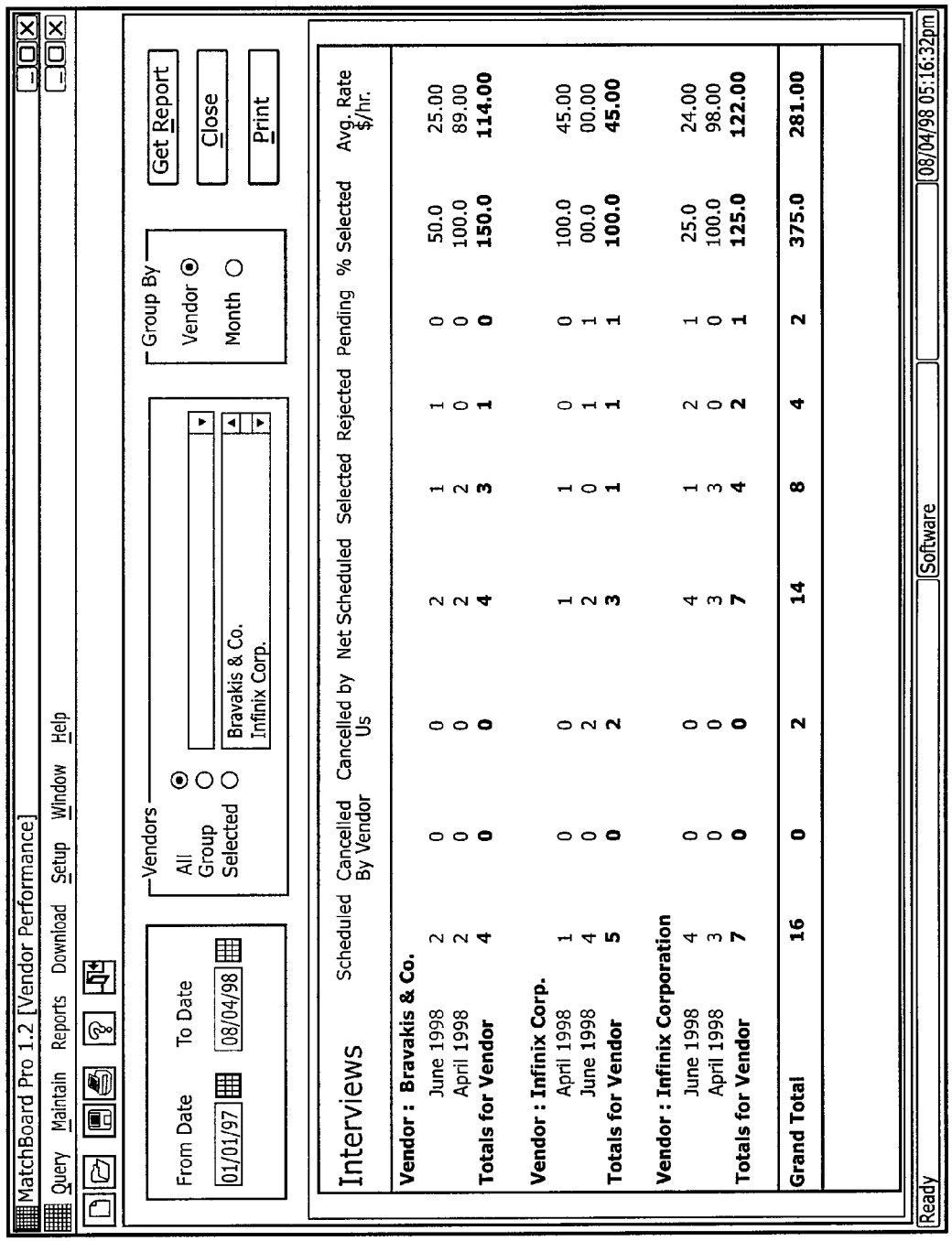
Figure 5K:
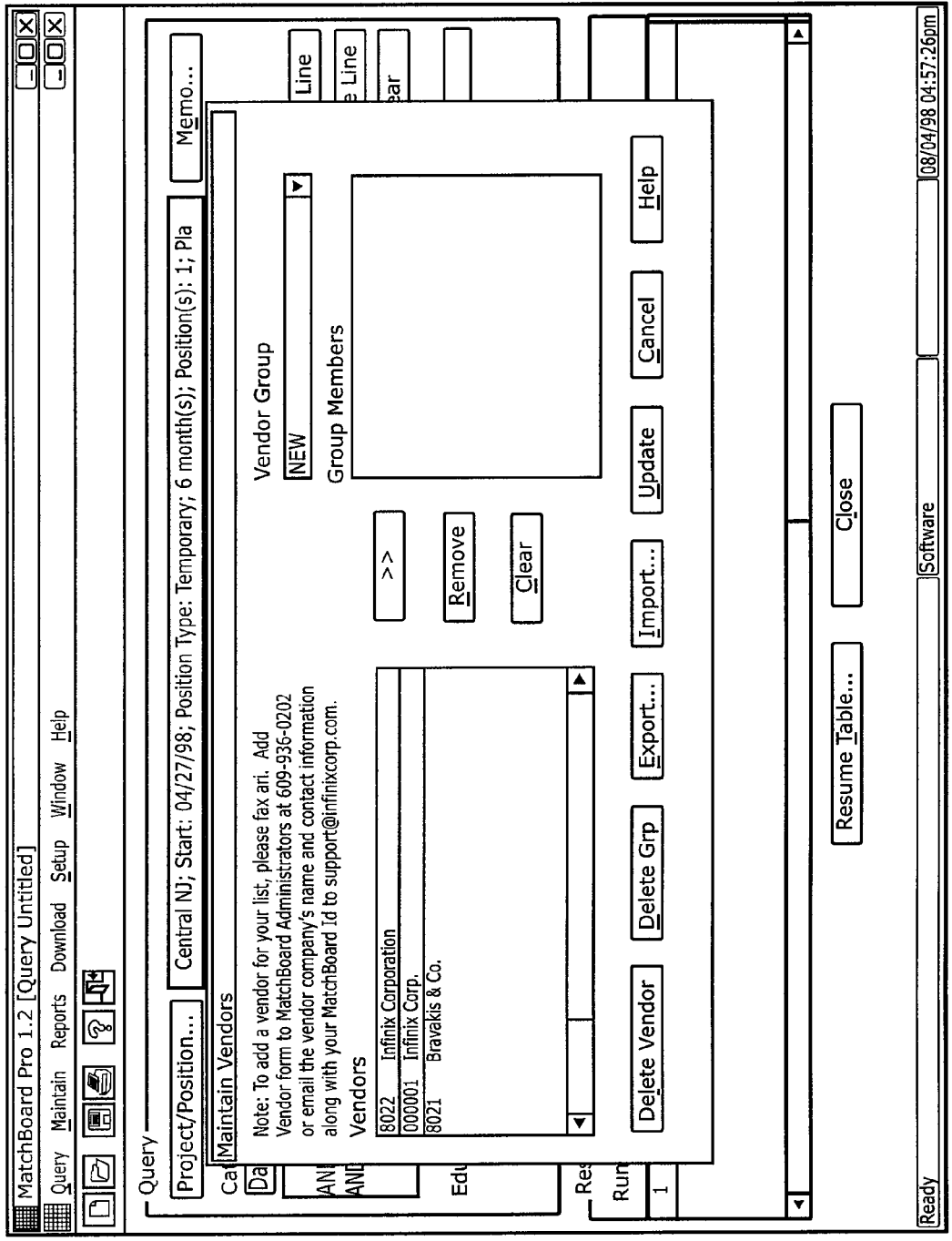
Figure 5I:
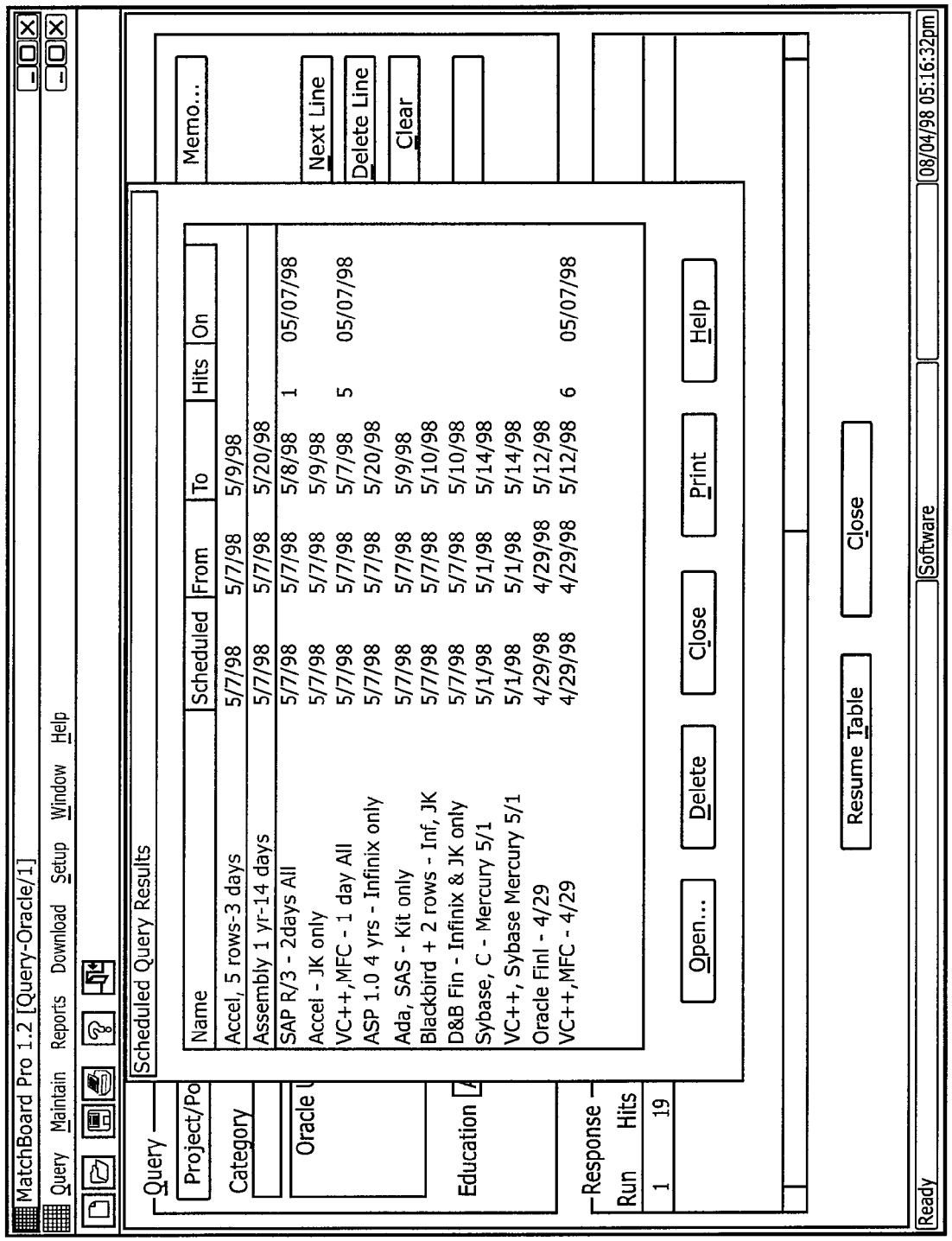
Figure 5M:
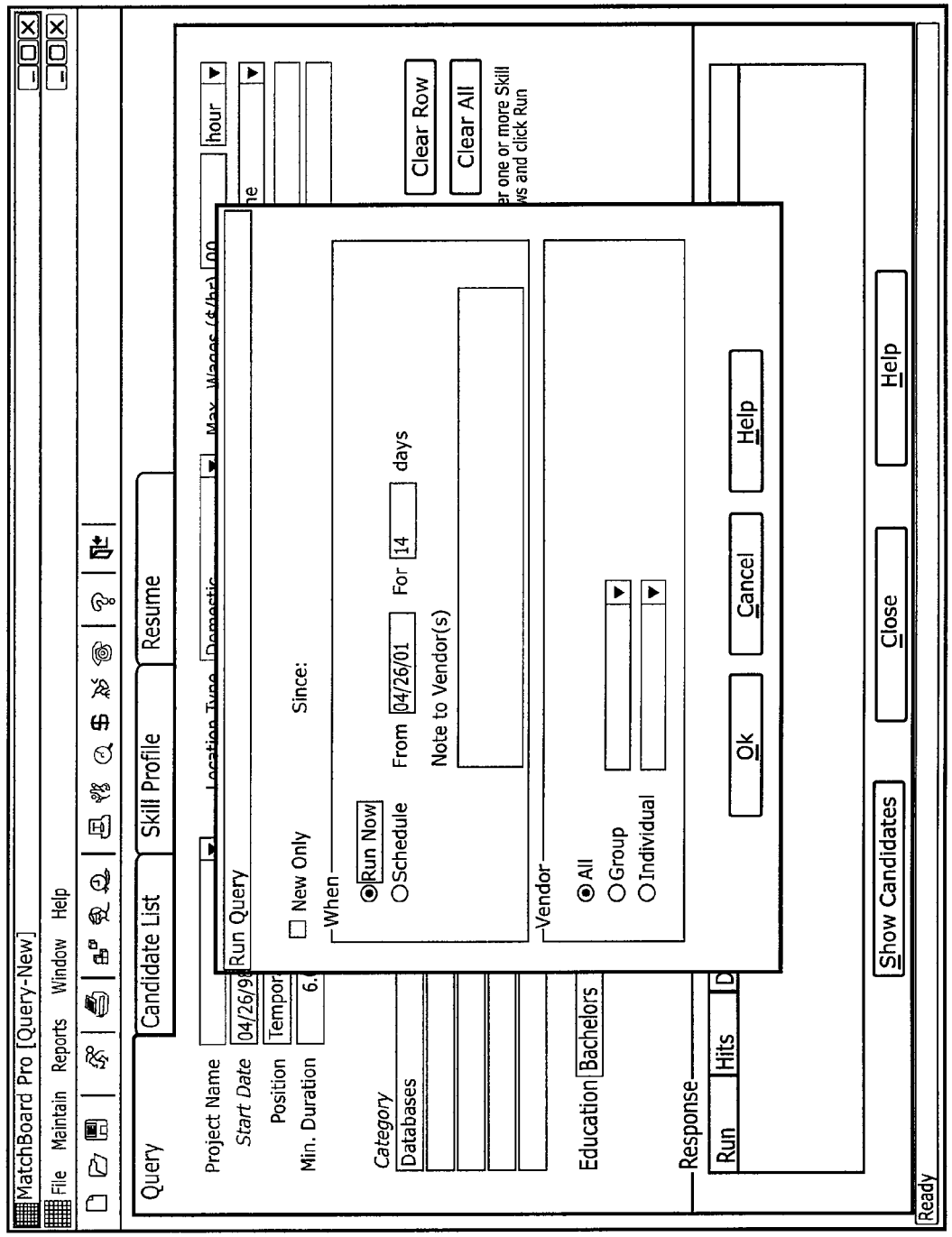
Figure 6D:
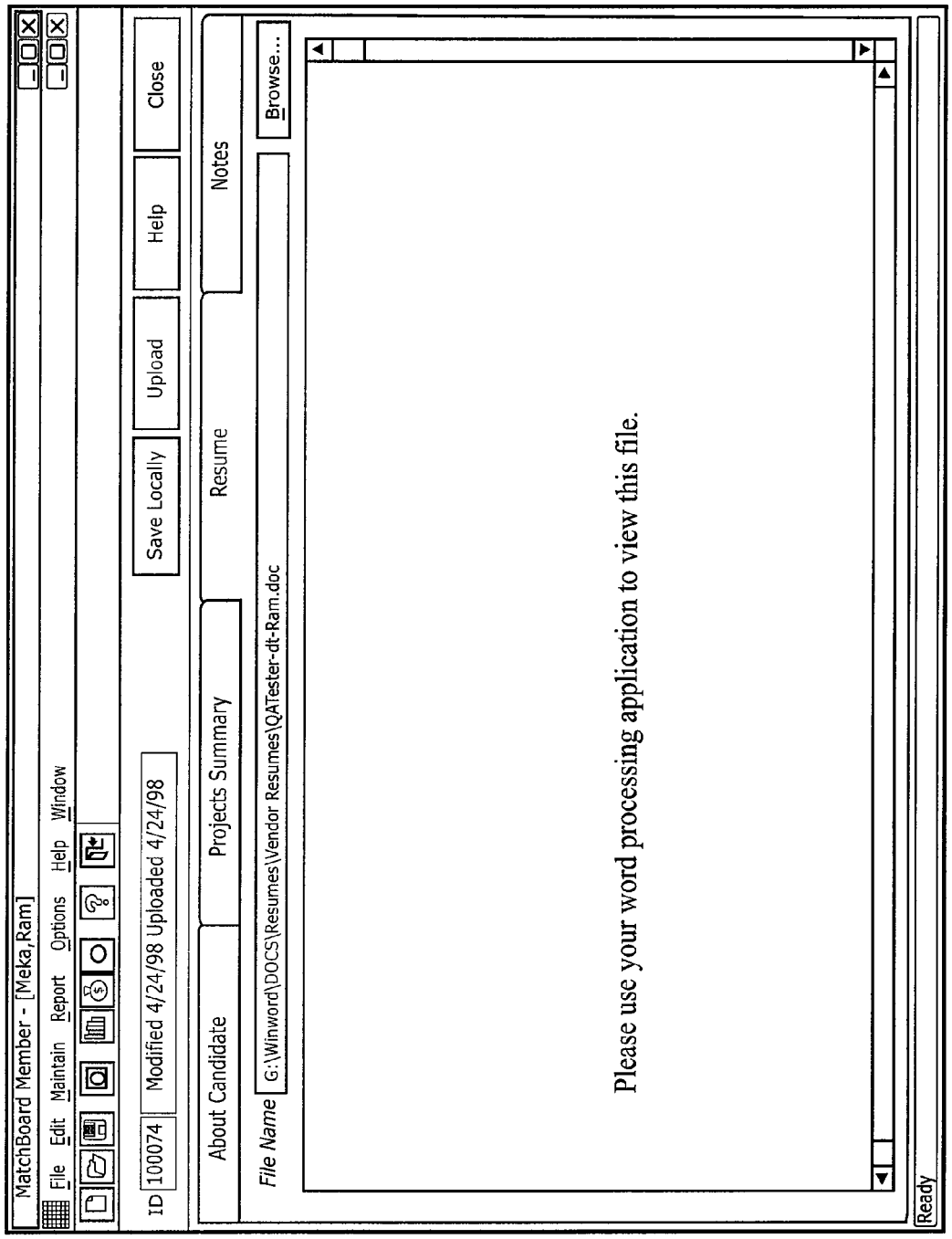
FIGS. 6a-n show screen print-outs of the results of the query.
Figure 6I:
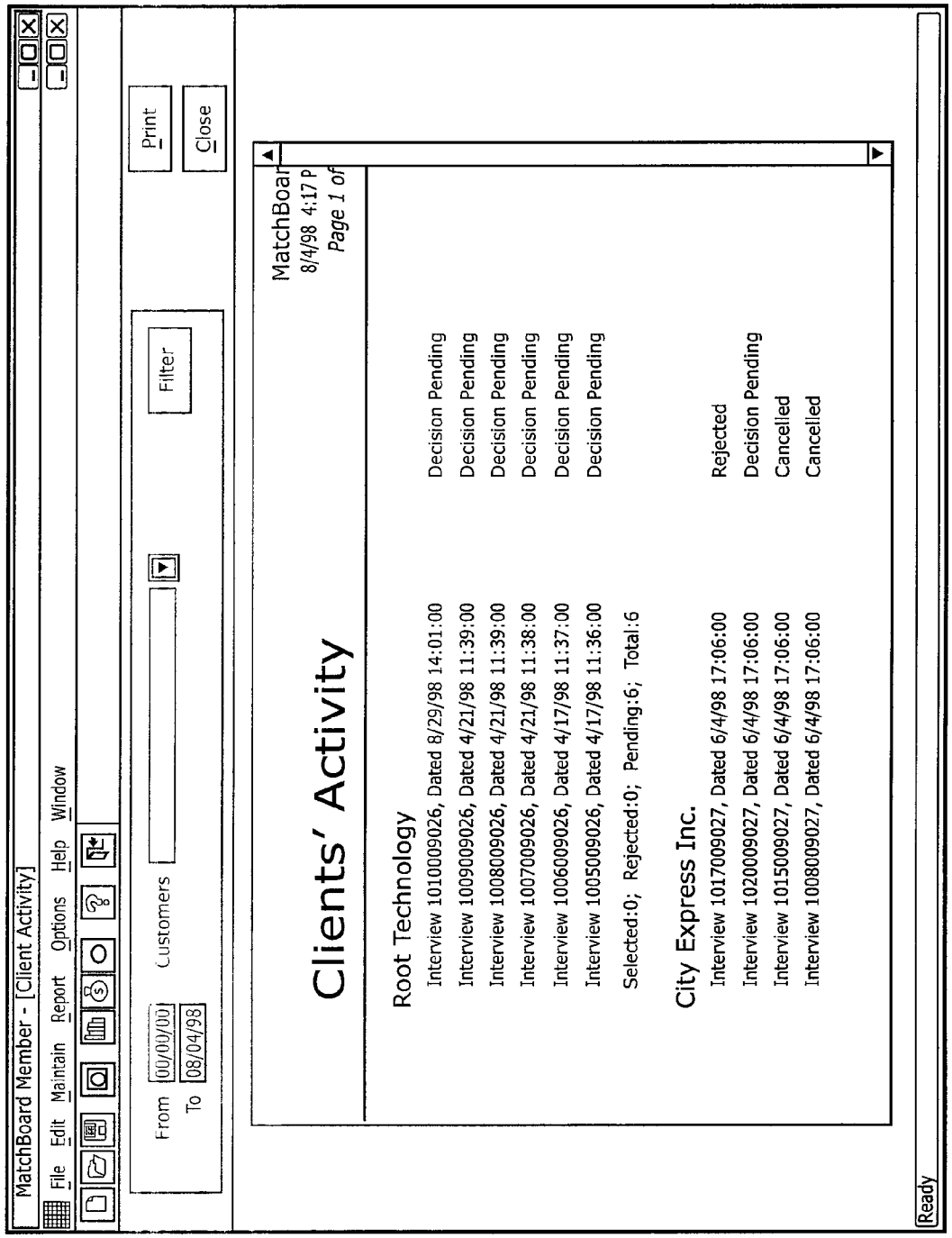
Figure 6K:
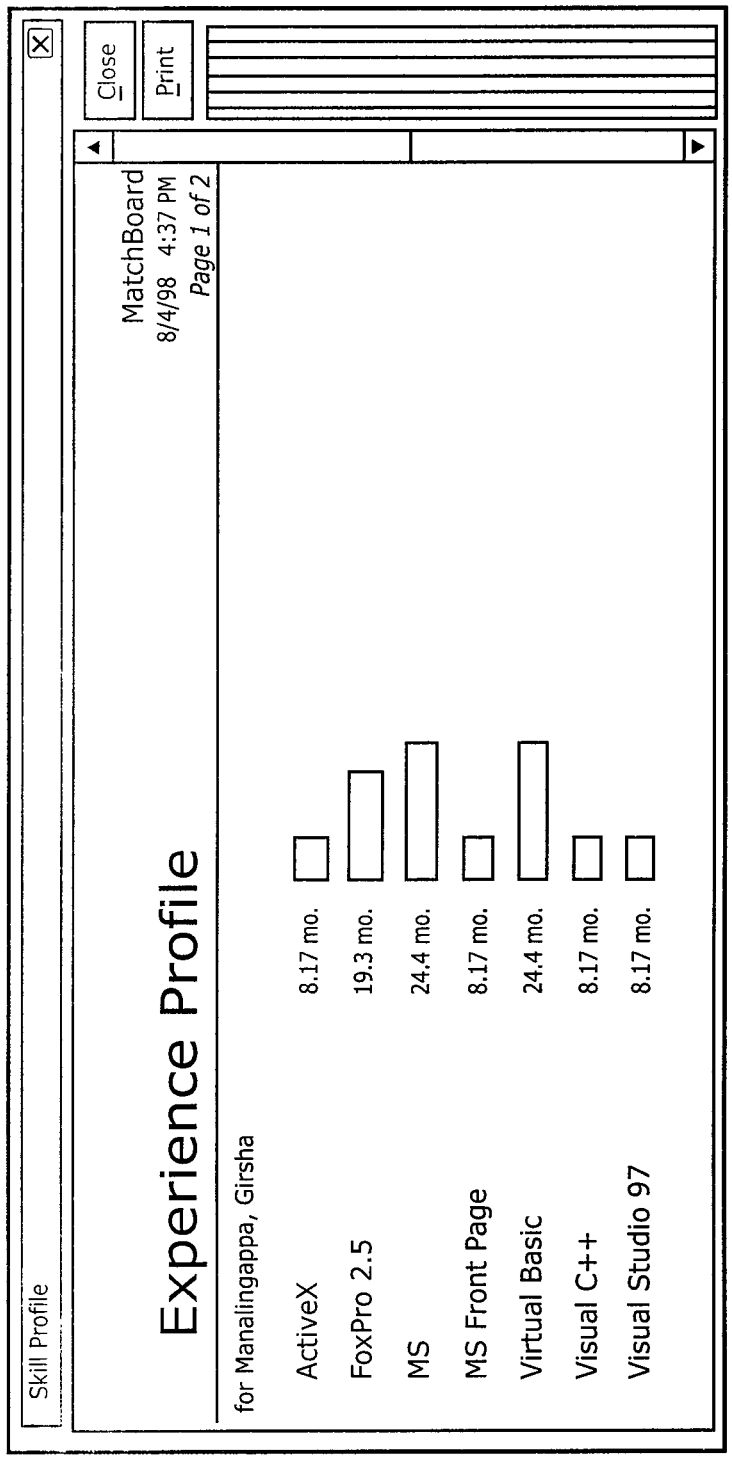
Figure 6M:
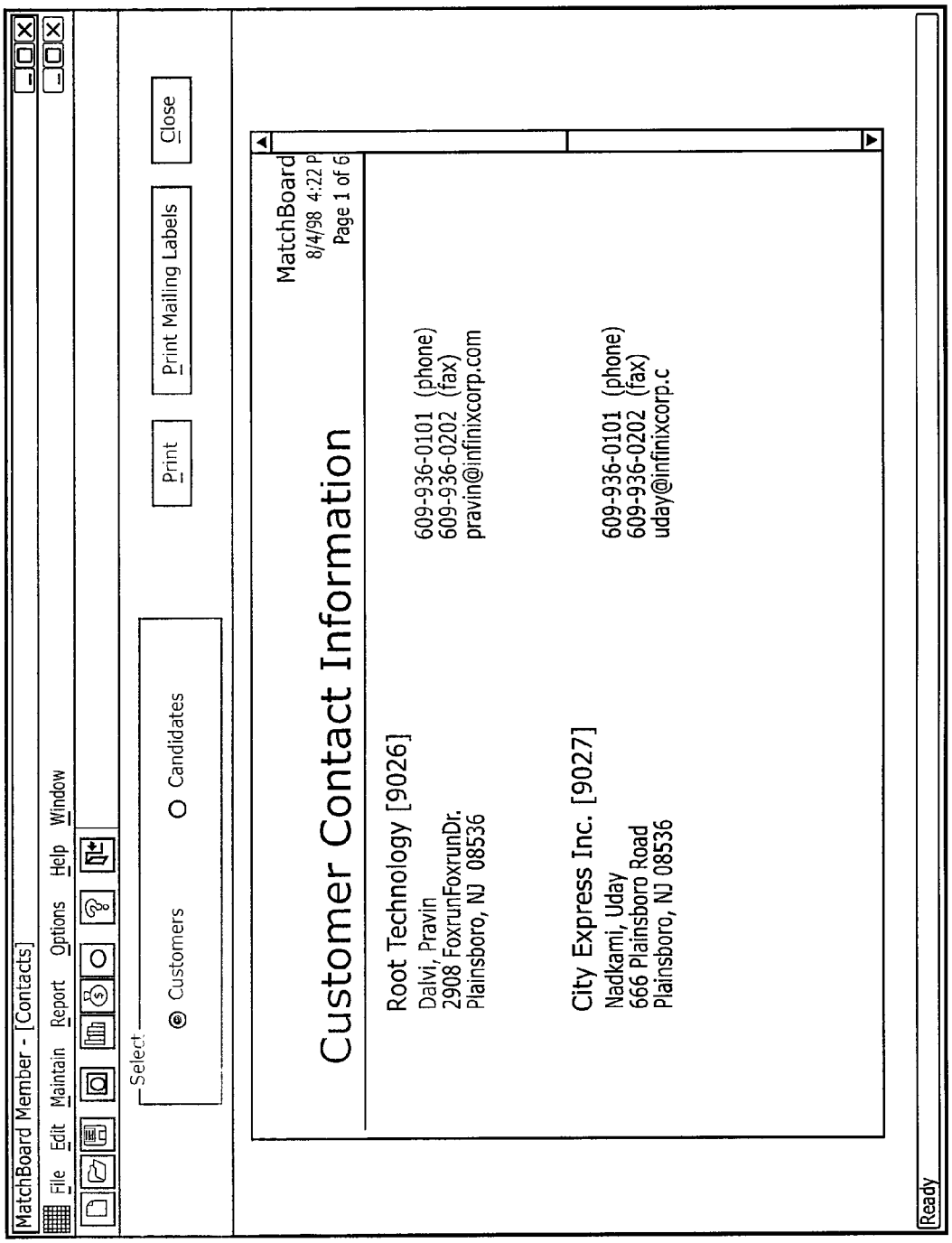
Figure 6N:
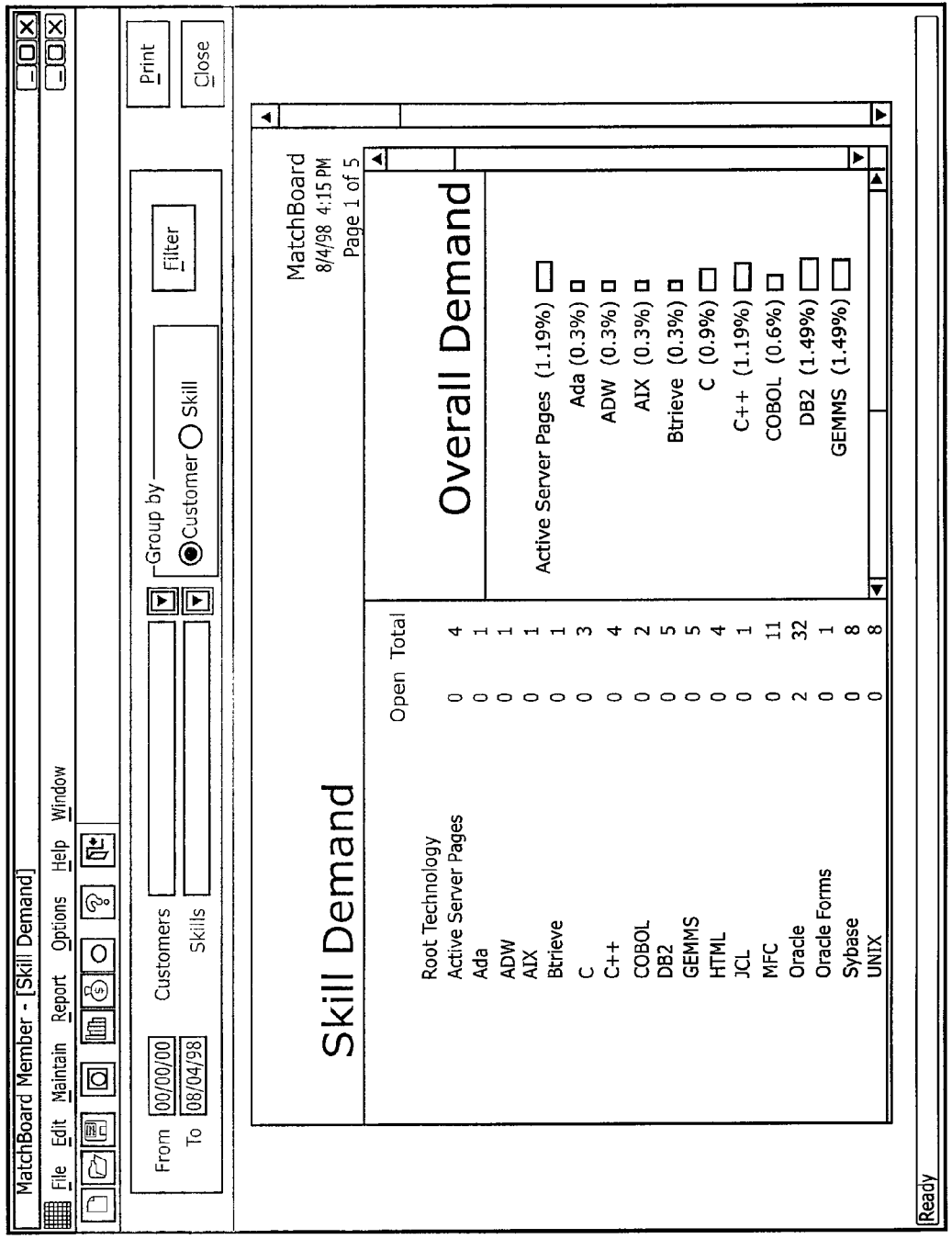

FIG. 4 corresponds to Block 201 in FIG. 2. and shows a flow diagram of a process which may be used to formulate a search query. It should be understood that the process for populating the database is similar to that for interrogating it—rather than selecting a field for a search, the candidate indicates that such a field applies to him or her.

Referring to FIG. 4, Block 401 provides for the selection of a profession in which the job opening exists (see Appendix A-2). Block 402 requests the employer to specify various attributes of the position, e.g. whether it is seeking a candidate for a full time or part time position, whether the position is for permanent employment or an independent contractor position, where the job is located, what it pays, whether travel is required, etc. (see Appendix A-2). Next the employer may specify the minimum educational requirements of the position (Block 403) and whether the résumés should be searched for specific keywords in the text (Block 404) (see Appendix A-3).

In Blocks 405 through 408, the employer constructs a query with respect to experience according to a hierarchical relational database (see Appendix A-3). A representative hierarchical, relational database is shown in Table 1. There, the first layer, pertaining to profession, is "Software." The next layer corresponds to categories of the profession, which, in this table, is "Database" and "Operating Systems." Below this layer is a third layer, "usage," which, in this table, corresponds to "Design," "Programming," "Database Administration," "Platform," and "System Administration." Depending on the "usage" layer is a fourth layer, skills, which, in this table, is "Sybase," "Oracle," "Unix," "Windows NT." The skill layer is further subdivided into versions. Members of these layers are related to each other in single and/or multiple hierarchy threads. Not shown in this table are the pointers used for retrieving data. Although Table 1 exemplifies the layers of a relational database used for experience in the software profession, it should be understood that it also applies to practically all other professions, such as legal, construction, and teaching professions, and applies to aspects of a candidate's résumé aside from experience such as education and job preferences.

TABLE 1

| LAYER | SEGMENT | | | | | | | | | | | | | | |
|---|---|---|---|---|---|---|---|---|---|---|---|---|---|---|---|
| PROFESSION | SOFTWARE | | | | | | | | | | | | | | |
| CATEGORY | DATABASES | | | | | | | | OPERATING SYSTEMS | | | | | | |
| USAGE | DESIGN | PROGRAMMING | | | DB ADMIN. | | | | PLATFORM | | | | SYS. ADMIN | | |
| SKILLS | SYBASE | | | ORACLE | | | | | UNIX | | | | WINDOWS | | |
| VERSION | SYSTEM 10 | SYSTEM 11 | 5.X | 6.X | 7.0 | 7.1 | 7.2 | 7.3 | HP.UX | AIX | SVR3 | SVR4 | 2.0 | 3.0 | 3.1 |

Given a particular database structure for the candidate skill or experience profile, the system prompts the candidates, vendors or employers in a systematic fashion to populate or search the database. In other words, the system prompts the user to select from a menu of fields in a particular order to ensure ease of use, control of the specification process, reduction of data entry error, and consistency across all modules of the system.

In Blocks 405 through 408, the employer decides to search a particular string of segments from the hierarchical database. In Blocks 405 and 406, the user may select a profession and a particular category within that profession. In Block 407, the employer is offered usage requirements within the particular category selected in Block 405. In Block 408, the employer may optionally select a specific item (version) in a further subcategory of the skill selected in Block 406. It should be understood that the selected string of hierarchical-related fields may be as long or as short as the user desires. In other words, the search may be based on just the broadest field, e.g., profession, or it can be based on a specific string of fields right down to the last layer in the hierarchical arrangement, e.g., version of software.

In Block 409, the employer then specifies the cumulative length of experience required in the above combination of skills specified in Blocks 405 through 408. If required, the employer may elect to specify additional skills as above, and the above steps are reiterated until the requirements are fully specified. Thus, after Block 410 a combination of a profession and subcategories of that profession is created along with a cumulative experience requirements for that particular combination.

The employer is prompted to make a selection of the vendors whose candidates he may prefer to search (Block 411), as well as to search for all candidates in the database or only the new ones he has not seen before (Block 413). In Block 412, the employer may elect to include candidates who may have assessed themselves to have superior knowledge in the skills specified.

In a preferred embodiment, the system has means for saving a query once configured. It is likely that a given employer will look to interview or employ more than one candidate with the same qualifications or to search periodically for a candidate having the same general qualifications. In such a situation, it is advantageous for the employer to save the search it created, and modify it accordingly when needed. The saving means allows the employer to store a number of different candidate qualifications in libraries, which may be combined and modified to form various search queries. Such saved searches may also be used to request easily the system to perform unattended automatic searches for candidates (Block 202, FIG. 2) (see Appendices A-12 & A-13).

According to the present invention, an employer may therefore specify a profession and a combination of subcategories within that profession for a candidate. Using relational database techniques and pattern matching algorithms, the combination can be searched logically within the system's database. For example, if an employer requires several years of a particular expertise in a particular skill, the relational database select command can pull up all relevant information on that particular skill for a candidate, even if the time is non-continuous, and sum that information together to provide for the total years of experience. Similarly, the system can make very fine distinctions between the types of skills utilized by a candidate on any assignment, and also on how the skill was used. The system also uses complex logic to establish the relationships between various members of any subcategory, so that it automatically includes those candidates who have the skills that are functionally superior or inclusive of the ones specified by the employer in the search. Such relational database search techniques are known in the art.

Once a search is performed, the results are transmitted to the employer for its review. In the preferred embodiment, the employer may play "what-if" games by fine tuning his search specification so as to get an optimum number of candidates to examine further. The results of the search are transmitted in a manner so as to provide the employer with a graphical or tabular representation of suitable candidates (see Appendix A-6). The representation may be, for example, a table with the combination of skills sought in columns and the suitable candidates in rows. The suitable candidate may be rearranged using sort commands and the like according to the employer's preferences. It also may be preferable to compare candidate using specialized bar charts and the like (e.g. a representation of a particular candidate may be provided that shows the candidate's experience plotted along a time line). Still other methods of displaying the results of the search will be obvious to those skilled in the art in light of the present invention.

Once a preferred candidate is identified, the system may provide means for scheduling an interview with the candidate. These means may request the employer to specify a preferred time, mode of interview (e.g. in-person or by telephone), the interviewer, his contact information, location, etc. (Appendix 8). The system may then automatically alert the appropriate vendor or a system administrator to contact the candidate and schedule the interview.

Obviously, numerous modifications and variations of the present invention are possible in the light of the above teachings. It is therefore understood that within the scope of the appended claims, the invention may be practiced other than as specifically described herein.

What is claimed is:

1. A method, comprising:
   populating two or more fields in a plurality of fields of a database of an internet-based system with information by prompting one or more respective candidates in a group of candidates, wherein the information specifies a plurality of skills and a plurality of amounts of experience associated with those skills for each of the one or more respective candidates;
   searching the database using a search query containing one or more parameters, wherein the one or more parameters include one or more desired lengths of experience for one or more corresponding skills;
   providing an employer with information specifying one or more matching candidates in response to the query, wherein each of the one or more matching candidates has an amount of experience for each of the one or more skills that is greater than or equal to the desired length of experience corresponding to that skill; and
   automatically prompting one or more parties to schedule an interview in response to determining that the query is satisfied by the one or more matching candidates.

2. The method of claim 1, wherein at least a portion of the plurality of fields are part of an information hierarchy.

3. The method of claim 1, wherein the plurality of fields comprise a plurality of professions, a plurality of subcategories within each profession, and a time duration for respective subcategories.

4. The method of claim 1, wherein the search query is formed by selecting one or more of a plurality of predefined responses that are hierarchically related to one or more prompts for employment criteria.

5. The method of claim 1, further comprising providing an indicator that is usable to render a visual indication of the information specifying the one or more matching candidates.

6. The method of claim 1, wherein prompting the one or more parties to schedule an interview includes prompting a matching candidate to schedule a telephone interview.

7. The method of claim 1, wherein the search query specifies a desired total length of time for a plurality of skills, wherein the desired total length of time is calculated by summing amounts of experience for each of the plurality of skills; and
   wherein each of the one or more matching candidates has a cumulative amount of experience in the plurality of skills that is equal or greater to the desired total length of time.

8. The method of claim 1, further comprising repeating the searching based on a saved query that includes the search query, and, in response to the repeating the searching, providing information specifying one or more additional matching candidates meeting the one or more parameters of the search query.

9. The method of claim 1, wherein prompting the one or more parties to schedule an interview includes prompting the employer for a preferred interview time.

10. A non-transitory computer-readable storage medium having instructions stored thereon that are executable by a processor to cause a computer system to perform operations comprising:

receiving a search query for a database via a network, wherein the database includes two or more fields in a plurality of fields that are populated with information from one or more respective candidates in a group of candidates, wherein the information specifies a plurality of skills and a plurality of amounts of experience associated with those skills for each of the one or more respective candidates;

searching the database using one or more parameters contained in the search query, wherein the one or more parameters include one or more desired lengths of experience for one or more corresponding skills;

providing information specifying one or more matching candidates in response to the query, wherein each of the one or more matching candidates has an amount of experience for each of the one or more skills that is greater than or equal to the desired length of experience corresponding to that skill; and automatically prompting one or more parties to schedule an interview in response to determining that the query is satisfied by the one or more matching candidates.

11. The non-transitory computer-readable storage medium of claim 10, wherein the search query specifies at least one computer programming skill.

12. The non-transitory computer-readable storage medium of claim 10, wherein automatically prompting the one or more parties to schedule an interview includes sending an on-line prompt to an employer via the Internet.

13. The non-transitory computer-readable storage medium of claim 10, wherein the plurality of fields comprise a plurality of professions, a plurality of subcategories within each profession, and a time duration for respective subcategories.

14. A system, comprising:
a processor; and
a computer-readable storage medium having instructions stored thereon that are executable by the processor to cause the system to perform operations comprising:
populating two or more fields in a plurality of fields of a database of an internet-based system with information by prompting one or more respective candidates in a group of candidates, wherein the information specifies a plurality of skills and a plurality of amounts of experience associated with those skills for each of the one or more respective candidates;
searching the database using a search query containing one or more parameters, wherein the one or more parameters include one or more desired lengths of experience for one or more corresponding skills;
providing an employer with information specifying one or more matching candidates in response to the query, wherein each of the one or more matching candidates has an amount of experience for each of the one or more skills that is greater than or equal to the desired length of experience corresponding to that skill; and
automatically prompting one or more parties to schedule an interview in response to determining that the query is satisfied by the one or more matching candidates.

15. The system of claim 14, further comprising providing an indicator that is usable to render a visual indication of the information specifying the one or more matching candidates.

16. The system of claim 14, wherein the search query specifies at least one skill related to a computer operating system.

17. The system of claim 14, wherein the operations further comprise repeating the searching based on a saved query that includes the search query.

* * * * *